United States Patent [19]

Hiratsuka et al.

[11] Patent Number: 5,301,271
[45] Date of Patent: Apr. 5, 1994

[54] IMAGE PROCESSING SEPARATELY PROCESSING TWO-DENSITY-LEVEL IMAGE DATA AND MULTI-LEVEL IMAGE DATA

[75] Inventors: Seiichiro Hiratsuka; Takanobu Kajikawa; Takunori Tsuji, all of Fukuoka; Takashi Kitada, Kasuga, all of Japan

[73] Assignee: Matsushita Electric Industrial Co., Ltd., Osaka, Japan

[21] Appl. No.: 863,972

[22] Filed: Apr. 6, 1992

[30] Foreign Application Priority Data

| Jul. 11, 1991 | [JP] | Japan | 3-170972 |
| Jul. 11, 1991 | [JP] | Japan | 3-170973 |
| Jul. 11, 1991 | [JP] | Japan | 3-170974 |
| Jul. 22, 1991 | [JP] | Japan | 3-180840 |
| Jul. 23, 1991 | [JP] | Japan | 3-182198 |

[51] Int. Cl.$^5$ .................................................. G06F 15/62
[52] U.S. Cl. ........................................ 395/164; 358/443
[58] Field of Search ............... 395/162, 164, 425; 358/443, 448, 456, 457, 462; 340/799

[56] References Cited

U.S. PATENT DOCUMENTS

| 4,589,144 | 5/1986 | Namba | 382/61 |
| 4,730,219 | 3/1988 | Oshikoshi et al. | 358/280 |
| 4,782,399 | 11/1988 | Sato | 358/456 |
| 4,953,114 | 8/1990 | Sato | 358/456 |
| 5,018,024 | 5/1991 | Tanioka | 358/457 |

FOREIGN PATENT DOCUMENTS

| 0027370 | 4/1981 | European Pat. Off. . |
| 64-37672 | 2/1989 | Japan . |
| 2162717 | 2/1986 | United Kingdom . |

Primary Examiner—Dale M. Shaw
Assistant Examiner—Kee M. Tung
Attorney, Agent, or Firm—Lowe, Price, LeBlanc & Becker

[57] ABSTRACT

An image processing system provided with a reception device for receiving image information and an output device for outputting image information at high resolution in case where the received image information is binary image information, and for outputting image information at resolution lower than resolution of the received image data in case where the received image information is other than binary image data. Thereby, a quantity of image information can be reduced without degradation of picture quality. Thus an image can be transmitted and stored.

9 Claims, 35 Drawing Sheets

IDM : IMAGE DISCRIMINATION MEMORY

IDM : IMAGE DISCRIMINATION MEMORY

FIG. 8

IMAGE DISCRIMINATION DATA

202496A H  | 0 1 ............................... 18 |0| ............................... 31 |

K-IMAGE-DATA

212496A H  | 0 1 ............................... 18 |1| ............................... 31 |

C-IMAGE-DATA

222496A H  | 0 1 ............................... 18 |0| ............................... 31 |

M-IMAGE-DATA

232496A H  | 0 1 ............................... 18 |0| ............................... 31 |

Y-IMAGE-DATA

IMAGE DISCRIMINATION DATA

```
             0  1              12 13                          31
20AF3A9 H   [  |  |--------------| 1| 1|-----------------------| ]
             0  1              12 13                          31
20AF4E1 H   [  |  |--------------| 1| 1|-----------------------| ]
```

K-IMAGE-DATA

```
             0  1              12 13                          31
21AF3A9 H   [  |  |--------------| 0| 0|-----------------------| ]
             0  1              12 13                          31
21AF4E1 H   [  |  |--------------| 0| 0|-----------------------| ]
```

C-IMAGE-DATA

```
             0  1              12 13                          31
22AF3A9 H   [  |  |--------------| 0| 1|-----------------------| ]
             0  1              12 13                          31
22AF4E1 H   [  |  |--------------| 0| 1|-----------------------| ]
```

M-IMAGE-DATA

```
             0  1              12 13                          31
23AF3A9 H   [  |  |--------------| 0| 0|-----------------------| ]
             0  1              12 13                          31
23AF4E1 H   [  |  |--------------| 0| 0|-----------------------| ]
```

Y-IMAGE-DATA

```
             0  1              12 13                          31
24AF3A9 H   [  |  |--------------| 1| 0|-----------------------| ]
             0  1              12 13                          31
24AF4E1 H   [  |  |--------------| 0| 0|-----------------------| ]
```

WOC : WRITING-OPERATION CONTROL
DISCR : DISCRIMINATION
PRM : PATTERN REGISTER MEANS

WRITING OPERATION CONTROL MEANS

SEL : SELECTOR
TRM : TIMING REGULATION MEANS

FIG. 20

| | | |
|---|---|---|
| ⑥ | ④ | ⑧ |
| ② | ① | ③ |
| ⑨ | ⑤ | ⑦ |

PRIORITIES FOR
HALFTONE BLOCK
SELECTION

FIG. 22(a)

| 0 | 0 | 0 | 0 | 0 | 0 | 0 |
|---|---|---|---|---|---|---|
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |

FIG. 22(b)

| 1 | 1 | 1 | 0 | 0 | 0 | 0 |
|---|---|---|---|---|---|---|
| 1 | 1 | 1 | 0 | 0 | 0 | 0 |
| 1 | 1 | 1 | 0 | 0 | 0 | 0 |
| 1 | 1 | 1 | 0 | 0 | 0 | 0 |
| 1 | 1 | 1 | 1 | 0 | 0 | 0 |
| 1 | 1 | 1 | 1 | 0 | 0 | 0 |
| 1 | 1 | 1 | 1 | 0 | 0 | 0 |

| 255 | 255 | 255 | 0 | 0 | 0 | 0 |
|---|---|---|---|---|---|---|
| 255 | 255 | 255 | 0 | 0 | 0 | 0 |
| 255 | 255 | 255 | 0 | 0 | 0 | 0 |
| 255 | 255 | 255 | 0 | 0 | 0 | 0 |
| 255 | 255 | 255 | 255 | 0 | 0 | 0 |
| 255 | 255 | 255 | 255 | 0 | 0 | 0 |
| 255 | 255 | 255 | 255 | 0 | 0 | 0 |

| 255 | 255 | 255 | 0 | 0 | 0 | 0 |
|---|---|---|---|---|---|---|
| 255 | 255 | 255 | 0 | 0 | 0 | 0 |
| 255 | 255 | 255 | 0 | 0 | 0 | 0 |
| 255 | 255 | 255 | 85 | 0 | 0 | 0 |
| 255 | 255 | 255 | 170 | 0 | 0 | 0 |
| 255 | 255 | 255 | 255 | 0 | 0 | 0 |
| 255 | 255 | 255 | 255 | 0 | 0 | 0 |

FIG. 25(a)

| 1 | 1 | 1 | 1 | 1 | 1 | 1 |
|---|---|---|---|---|---|---|
| 1 | 1 | 1 | 1 | 1 | 1 | 1 |
| 1 | 1 | 1 | 1 | 1 | 1 | 1 |
| 1 | 1 | 1 | 1 | 1 | 1 | 1 |
| 1 | 1 | 1 | 1 | 1 | 1 | 1 |
| 1 | 1 | 1 | 1 | 1 | 1 | 1 |
| 1 | 1 | 1 | 1 | 1 | 1 | 1 |

FIG. 25(b)

| 0 | 1 | 0 | 1 | 0 | 1 | 1 |
|---|---|---|---|---|---|---|
| 0 | 1 | 1 | 0 | 1 | 1 | 0 |
| 0 | 1 | 0 | 1 | 0 | 1 | 1 |
| 1 | 0 | 1 | 0 | 1 | 1 | 0 |
| 0 | 1 | 0 | 1 | 1 | 0 | 1 |
| 1 | 1 | 1 | 1 | 0 | 1 | 0 |
| 1 | 0 | 1 | 0 | 1 | 0 | 1 |

FIG. 26(a)

|   |   |   |   |   |   |
|---|---|---|---|---|---|
|   | 5 | 6 | 7 |   |   |
|   | 6 | 6 | 7 |   |   |
|   | 7 | 7 | 9 |   |   |
|   |   |   |   |   |   |

FIG. 26(b)

| 85 | 85 | 102 | 102 | 119 | 119 |
|---|---|---|---|---|---|
| 85 | 85 | 102 | 102 | 119 | 119 |
| 102 | 102 | 102 | 102 | 119 | 119 |
| 102 | 102 | 102 | 102 | 119 | 119 |
| 119 | 119 | 119 | 119 | 153 | 153 |
| 119 | 119 | 119 | 119 | 153 | 153 |

FIG. 27(a)

| 1 | 1 | 0 | 0 | 0 | 0 | 0 |
|---|---|---|---|---|---|---|
| 1 | 1 | 1 | 0 | 0 | 0 | 0 |
| 1 | 1 | 1 | 0 | 0 | 0 | 0 |
| 1 | 1 | 1 | 0 | 0 | 0 | 0 |
| 1 | 1 | 1 | 0 | 0 | 0 | 0 |
| 1 | 1 | 1 | 1 | 0 | 0 | 0 |
| 1 | 1 | 1 | 1 | 0 | 0 | 0 |

FIG. 27(b)

| 0 | 1 | 1 | 1 | 1 | 0 | 0 |
|---|---|---|---|---|---|---|
| 0 | 1 | 0 | 1 | 1 | 0 | 0 |
| 0 | 1 | 0 | 1 | 1 | 0 | 0 |
| 1 | 0 | 1 | 1 | 1 | 1 | 0 |
| 0 | 1 | 0 | 1 | 1 | 1 | 0 |
| 1 | 1 | 1 | 1 | 1 | 1 | 0 |
| 1 | 0 | 1 | 0 | 1 | 1 | 0 |

FIG. 28(a)

| 0 | 0 | 1 | 1 | 1 | 0 | 0 |
|---|---|---|---|---|---|---|
| 0 | 0 | 0 | 1 | 1 | 0 | 0 |
| 0 | 0 | 0 | 1 | 1 | 0 | 0 |
| 0 | 0 | 0 | 1 | 1 | 1 | 0 |
| 0 | 0 | 0 | 1 | 1 | 1 | 0 |
| 0 | 0 | 0 | 0 | 1 | 1 | 0 |
| 0 | 0 | 0 | 0 | 1 | 1 | 0 |

FIG. 28(c)

| 0 | 0 | 170 | 255 | 255 | 0 | 0 |
|---|---|-----|-----|-----|---|---|
| 0 | 0 | 85 | 255 | 255 | 0 | 0 |
| 0 | 0 | 0 | 255 | 255 | 85 | 0 |
| 0 | 0 | 0 | 255 | 255 | 170 | 0 |
| 0 | 0 | 0 | 170 | 255 | 255 | 0 |
| 0 | 0 | 0 | 85 | 255 | 255 | 0 |
| 0 | 0 | 0 | 0 | 255 | 255 | 0 |

FIG. 28(b)

| 0 | 0 | 255 | 255 | 255 | 0 | 0 |
|---|---|-----|-----|-----|---|---|
| 0 | 0 | 0 | 255 | 255 | 0 | 0 |
| 0 | 0 | 0 | 255 | 255 | 0 | 0 |
| 0 | 0 | 0 | 255 | 255 | 255 | 0 |
| 0 | 0 | 0 | 255 | 255 | 255 | 0 |
| 0 | 0 | 0 | 0 | 255 | 255 | 0 |
| 0 | 0 | 0 | 0 | 255 | 255 | 0 |

FIG. 28(d)

| 0 | 0 | 255 | 255 | 255 | 0 | 0 |
|---|---|-----|-----|-----|---|---|
| 0 | 0 | 0 | 255 | 255 | 0 | 0 |
| 0 | 0 | 0 | 255 | 255 | 85 | 0 |
| 0 | 0 | 0 | 255 | 255 | 170 | 0 |
| 0 | 0 | 0 | 255 | 255 | 255 | 0 |
| 0 | 0 | 0 | 0 | 255 | 255 | 0 |
| 0 | 0 | 0 | 0 | 255 | 255 | 0 |

FIG. 29(a)

| 0 | 1 | 0 | 0 | 0 | 0 | 0 |
|---|---|---|---|---|---|---|
| 0 | 1 | 0 | 0 | 0 | 0 | 0 |
| 0 | 1 | 0 | 0 | 0 | 0 | 0 |
| 1 | 0 | 1 | 0 | 0 | 0 | 0 |
| 0 | 1 | 0 | 0 | 0 | 0 | 0 |
| 1 | 1 | 1 | 1 | 0 | 0 | 0 |
| 1 | 0 | 1 | 0 | 0 | 0 | 0 |

FIG. 29(c)

| 5 | 5 | 0 | |
|---|---|---|---|
| 6 | 6 | 0 | |
| 7 | 7 | 0 | |
| | | | |

FIG. 29(b)

| 5 | 0 | 0 | |
|---|---|---|---|
| 6 | 0 | 0 | |
| 7 | 0 | 0 | |
| | | | |

FIG. 29(d)

| 85 | 85 | 85 | 85 | 0 | 0 |
|---|---|---|---|---|---|
| 85 | 85 | 85 | 85 | 0 | 0 |
| 102 | 102 | 102 | 102 | 0 | 0 |
| 102 | 102 | 102 | 102 | 0 | 0 |
| 119 | 119 | 119 | 119 | 0 | 0 |
| 119 | 119 | 119 | 119 | 0 | 0 |

FIG. 30

| 85 | 85 | 255 | 255 | 255 | 0 | 0 |
|----|----|-----|-----|-----|---|---|
| 85 | 85 | 85  | 255 | 255 | 0 | 0 |
| 102|102 | 102 | 255 | 255 | 85 | 0 |
| 102|102 | 102 | 255 | 255 |170 | 0 |
| 119|119 | 119 | 255 | 255 |255 | 0 |
| 119|119 | 119 | 119 | 255 |255 | 0 |
|    |    |     |     | 255 |255 | 0 |

| CENTRAL PIXEL SIGNAL | BINARY JUDGEMENT SIGNAL | EDGE SMOOTHING DETECTION SIGNAL | BINARY EXPANSION SIGNAL |
|---|---|---|---|
| 0 | 0 | 0 | 0 |
| 0 | 0 | 1 | 0 |
| 0 | 1 | 0 | 0 |
| 0 | 1 | 1 | 85 |
| 1 | 0 | 0 | 255 |
| 1 | 0 | 1 | 255 |
| 1 | 1 | 0 | 255 |
| 1 | 1 | 1 | 170 |

IMAGE PROCESSING SEPARATELY PROCESSING TWO-DENSITY-LEVEL IMAGE DATA AND MULTI-LEVEL IMAGE DATA

BACKGROUND OF THE INVENTION

1. Field of the Invention

This invention relates to an image processing system provided with an image memory, which can print a halftone image.

2. Description of the Prior Art

Heretofore, many kinds of printers have been proposed according to various principles as an output terminal for a personal computer, a workstation or the like. In recent years, especially, monochrome laser beam printers (hereunder abbreviated as LBPs), each of which employs an electrophotographic process and laser techniques and excels in a recording speed and print quality, have rapidly come into wide use.

Meanwhile, there have been upsurged demands for a full color LBP in the market. However, in case of a full color LBP, not only color halftone image data but also binary image data as treated by monochrome LBPs are objects to be outputted. The full color LBP is, therefore, required to process halftone image data, as well as binary image data.

Generally, image output equipments such as LBPs employing an electrophotographic process have a defect in instability of results of the electrophotographic process itself. Thus monochromatic or two-level outputs are often employed in such image output equipments. In conventional monochrome printers, a binary dither method is frequently used for printing a halftone image portion.

Hereinafter, the principles of the dither method will be described by referring to FIG. 39. First, pixels of an image are partitioned into blocks a, each of which is a N×M pixel grid (incidentally, in case of this example, a 4 by 4 pixel grid). Then, the intensity or tone level of each pixel of one of the blocks a is compared with the dither value of a corresponding element of a corresponding one of threshold matrices b, each of which is comprised of N×M elements (incidentally, in case of this example, a 4×4 elements). Further, the intensity level of each pixel thereof is changed to binary level (namely, 0 or 1) according to a result of the comparison. Namely, if the intensity level of a pixel thereof is greater than the dither value of a corresponding element of the corresponding threshold matrix, the intensity level of the pixel is changed to 1. Otherwise, the intensity level of the pixel is changed to 0. Such a processing is repeatedly performed on each of the other blocks. consequently, a dither image c is obtained. Incidentally, there are two types of threshold matrices. One is a threshold matrix of what is called the dot concentration type, which is employed to concentrate dots and obtain smooth tone. The other is a threshold matrix of what is called the dot dispersion type, which is employed to disperse dots in case of making much of resolution.

FIG. 40 illustrates the configuration of a circuit for performing a dither method. When a pixel to be compared is serially selected from pixels of a block of an input image represented by an input image signal, an element of the threshold matrix, which has a row and column numbers thereof corresponding to the position of the selected pixel in the block, is addressed or accessed. Then, the threshold or dither value of the addressed element is read out of a matrix memory. Subsequently, the intensity level of the selected pixel, which is indicated by the input image signal, is compared to the read dither value of the addressed element to obtain binary level of the selected pixel. Thereafter, data representing a two-valued image (hereunder referred to as a binary image) to be printed, which have been obtained by calculating binary levels of pixels of the input image as above described, are sent to a printer engine and then are printed. The binary dither method described above, however, has defects in that dither patterns are noticeable in the printed image and that the resolution in a halftone portion is low.

Recently, has been developed a printer engine which can print a multi-level image having more than two intensity levels. Even a system employing such a printer engine, however, has drawbacks in that a memory, the storage capacity of which is 30 megabytes (MB) or more, is needed for printing a full-color image on paper, the size of which is A4, by using the resolution of 300 dots per inch (dpi) and 256 intensity levels, in that the costs of a printer become high and moreover the size thereof becomes large, in that when employing a low-cost two-level (namely, monochromatic) printer, picture quality is low and in that when employing a multi-level printer capable of printing a full color image, a bulk image memory is required and thus the cost becomes considerably high. The present invention is created to eliminate the above described drawbacks of the prior art.

SUMMARY OF THE INVENTION

It is, therefore, an object of the present invention to provide a image processing system which can treat high picture quality image by transmitting and storing a small quantity of image information.

To achieve the foregoing object, in accordance with the present invention, there is provided an image processing system, which comprises reception means for receiving image data and output means for outputting image data at high resolution in case where the received image data is two-valued image data (hereunder referred to as two-density-level image data or to simply as binary image data), and for outputting image data at resolution lower than resolution of the received image data in case where the received image data is other than binary image data.

In particular, an the image processing system includes reception means for receiving image information, first storage means for storing image information at high resolution in case where the received image information is of a two-density-level type and for storing image information at resolution lower than the high resolution in case where the received image information is of a type other than a two-density-level type, second storage means for storing discrimination information indicating whether or not the image information stored in the first storage means is of a two-density-level type, and output means for reading the image information from the first storage means and the discrimination information from the second storage means, for outputting the read image information by changing the resolution corresponding to the image information of a two-density-level image type as equal to that corresponding to the image information of a type other than a two-density-level image type, and for outputting the read discrimination information.

BRIEF DESCRIPTION OF THE DRAWINGS

Other features, objects and advantages of the present invention will become apparent from the following description of a preferred embodiment with reference to the drawings in which like reference characters designate like or corresponding parts throughout several views, and in which:

FIG. 8 is a diagram for illustrating a writing of binary data to the image memory of the image processing system embodying the present invention;

FIG. 9 is a diagram for illustrating a writing of half-tone data to the image memory of the image processing system embodying the present invention;

FIG. 20 is a diagram for illustrating priorities of blocks in a half-tone selection processing to be performed by the image processing system embodying the present invention;

FIG. 22(a) is a diagram for illustrating binary data stored in the image discrimination memory of the image processing system embodying the present invention;

FIG. 22(b) is a diagram for illustrating binary data stored in the image data memory of the image processing system embodying the present invention;

FIG. 25(a) is a diagram for illustrating half-tone data stored in the image discrimination memory of the image processing system embodying the present invention;

FIG. 25(b) is a diagram for illustrating half-tone data stored in the image data memory of the image processing system embodying the present invention;

FIGS. 26(a) and 26(b) are diagrams for illustrating a half-tone data expansion processing to be performed by the image processing system embodying the present invention;

FIG. 27(a) is a diagram for illustrating coexistent binary and half-tone data stored in the image discrimination memory of the image processing system embodying the present invention in case where binary and half-tone data are coexistent with each other;

FIG. 27(b) is a diagram for illustrating coexistent half-tone and binary data stored in the image data memory of the image processing system embodying the present invention in case where binary and half-tone data are coexistent with each other;

FIGS. 28(a) to 28(d) are diagrams for illustrating a binary data expansion processing to be performed by the image processing system embodying the present invention in case where binary and half-tone data are coexistent with each other;

FIGS. 29(a) to 29(d) are diagrams for illustrating a half-tone data expansion processing to be performed by the image processing system embodying the present invention in case where binary and half-tone data are coexistent with each other;

FIG. 30 is a diagram for illustrating expanded data obtained by the image processing system embodying the present invention in case where binary and half-tone data are coexistent with each other;

DETAILED DESCRIPTION OF THE PREFERRED EMBODIMENT

Hereinafter, a preferred embodiment of the present invention will be described in detail by referring to the accompanying drawings. It should be noted that, in the following description, a "halftone" image means a "multi-level" image and a "binary" image means a "bi-level" image.

Figure 1:
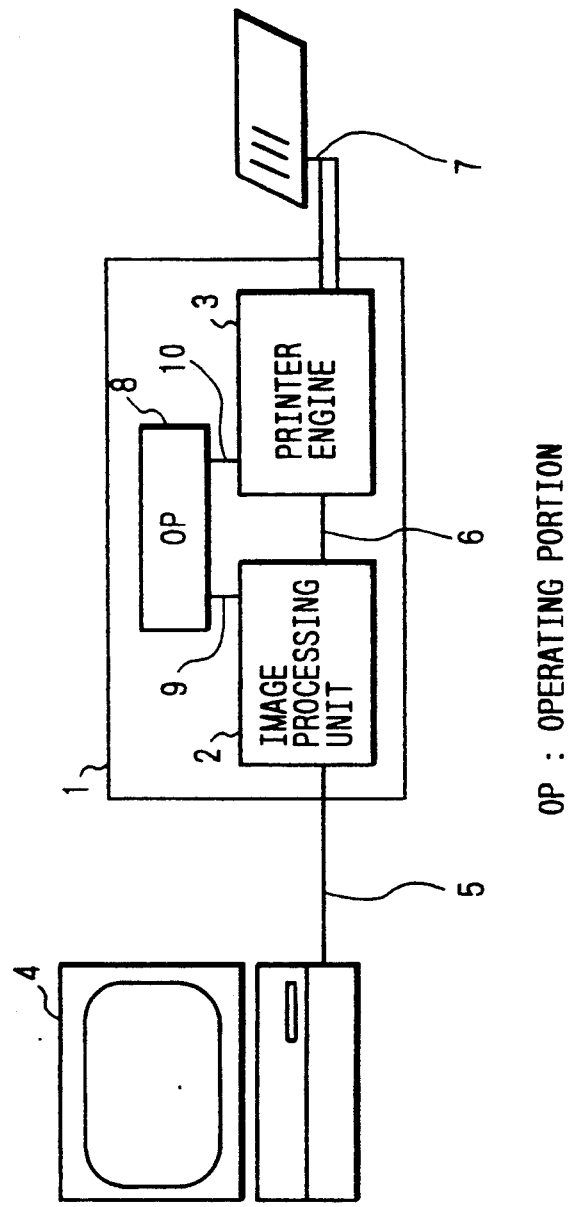
FIG. 1 is a schematic block diagram for illustrating an image forming apparatus which employs an image processing system embodying the present invention.

FIG. 1 is a schematic block diagram for illustrating the configuration of an image forming apparatus which employs an image processing system embodying the present invention. The image forming apparatus 1 is comprised of an image processing unit, which generates image data from a printer code signal 5 sent from a host computer 4 and outputs an image recording signal 6 representing the image data, and a printer engine 3 for forming a record image from the image recording signal 6.

In this embodiment, the printer code signal 5 sent from the host computer 4 is employed as a source of image information. However, an image file, a video image signal or the like may be employed as the source of image information.

Further, there are many kinds of the printer code signals 5 correspondingly to printers which are different in printer control language and page-description language from one another.

The printer engine 3 is of the laser-exposure color electrophotographic type. Further, the recording density thereof is 300 dpi. Moreover, with respect each color, the intensity or density of each pixel has 256 levels.

An operating portion 8 sends a image density regulating signal 9 to the image processing unit 2 in order to regulate the density of a half-tone image portion. Additionally, the operating portion 8 sends a maximum density regulation signal 10 to the printer engine 3 in order to regulate the densities of characters and lines of a line drawing. Then, the maximum density of pixels of an image is regulated in the printer engine 3 by changing processing conditions.

Figure 2:
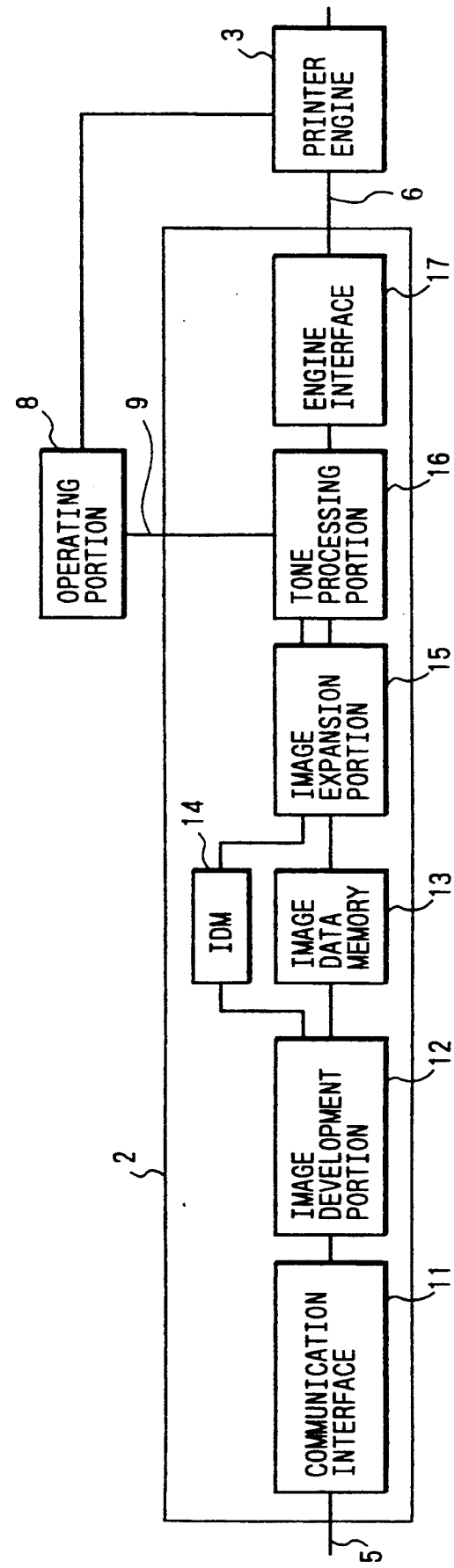
FIG. 2 is a schematic block diagram for illustrating the image processing system employing the present invention.

FIG. 2 shows the inner structure of the image processing unit 2. A communication interface 11 communicates with the host computer and receives the printer code signal 5. Subsequently, an image generation portion 12 interprets the printer code represented by the printer code signal 5 and further writes the generated image information to an image memory composed of an image data memory 13 and an image discrimination memory 14.

An image expansion portion 15 converts image information received from the image data memory 13 and the image discrimination memory 14 to image information represented by using the resolution and tone-levels to be employed in the printer engine 3. Simultaneously, the image expansion portion 15 performs a process of improving picture quality of binary characters and lines of the line drawing. A tone processing portion 16 performs a process of stabilizing a tone to be reproduced by the printer engine 3 in addition to processings such as an image density regulation processing, a gamma correction processing and a screen-angle forming processing. An engine interface 17 serves to transmit an output signal of the tone processing portion 16 to the printer engine 3.

Figure 3:
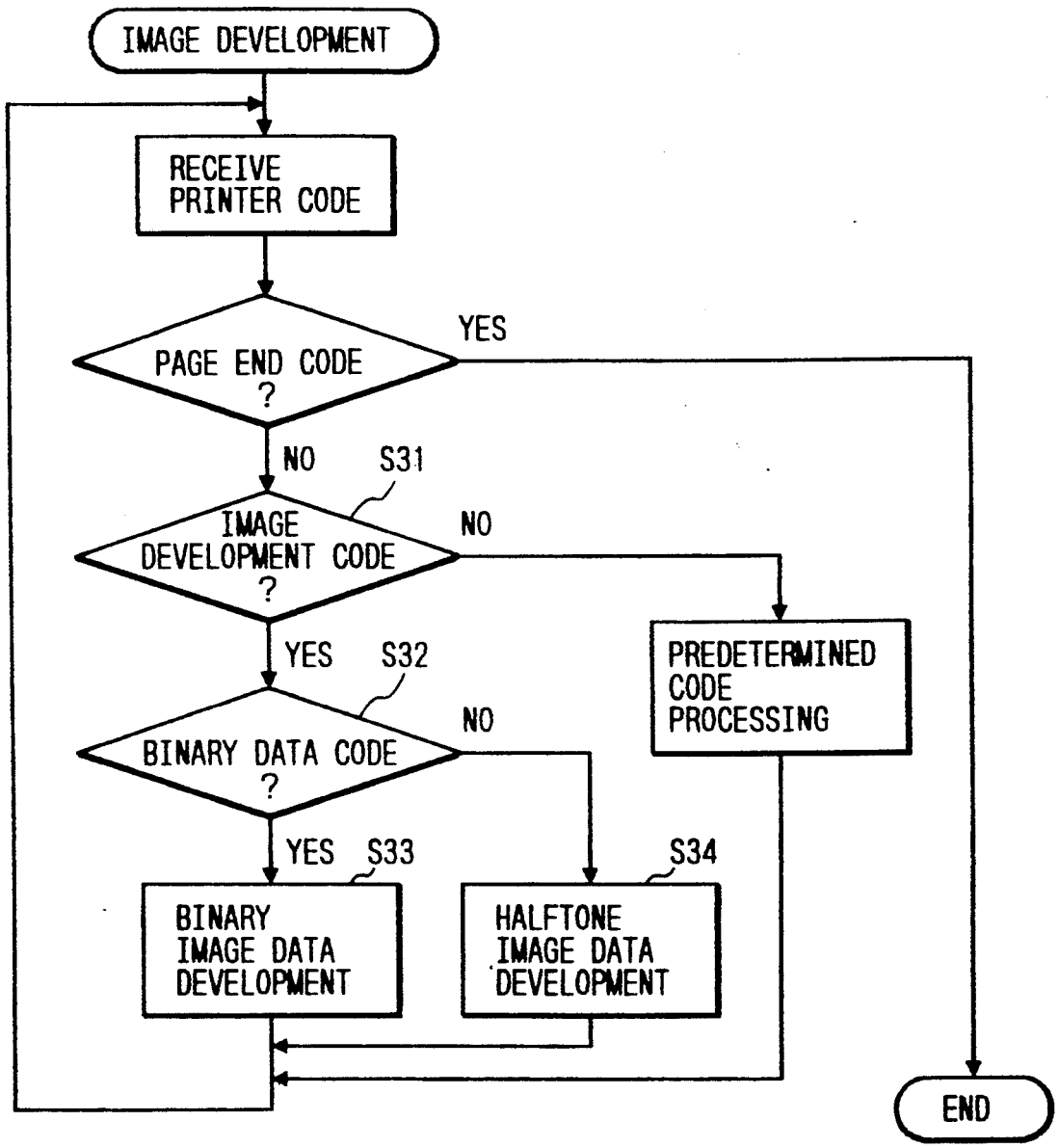
FIG. 3 is a flowchart for illustrating a processing performed in an image development portion of the image processing system employing the present invention.

Next, the image development portion 12 will be described in detail hereinbelow. Incidentally, in the instant application, a generating of image information or image data of the type, which should be stored in the image data memory and the image discrimination memory, (from printer codes, original image information or original image data which are input from various image input devices and represent originally measured or determined intensity levels and kinds of colors of pixels) is referred to as an image development. Thus, for example, an expression "to develop a code to image data" means "to generate image data of the format, which can be stored in the image data memory and the image discrimination memory, (from a code or original image data)". Further, for instance, an expression "an image development of a pixel" means "a generating of image information on or image data of a pixel, which is of the format that can be stored in the image data memory and the image discrimination memory". FIG. 3 is a flowchart of a processing program to be executed for performing the processings in the image development portion 12. Namely, the processings to be performed by the image development portion 12 is effected by executing software. In case where the printer codes are interpreted to effect an image development, namely to generate image information to be stored in the image memory, the following procedure is carried out as illustrated in FIG. 3.

In step S31, it is determined whether or not the printer code received by the image development portion 12 is a code (hereunder sometimes referred to as an image development code) relating to an image development (namely, a code to be developed to image information or data). If the received code does not relates to an image development, the system effects a predetermined processing which is the same as the processing to be performed by a conventional printer.

Among codes represented by PostScript language (incidentally, "PostScript" is a registered trademark of Adobe Systems Inc.), examples of codes relating to an image development are as follows:

fill (indicating that an area should be filled with a solid color); and image (indicating that an image data should be generated from the code). Further, examples of codes, which do not relates to an image development, are as follows:

add (namely, an addition operator); and copypage (indicating a page output).

Thus the image development codes can clearly be discriminated from the codes which do not relate to an image development.

Then, in step S32, if the received code relates to an image development, it is determined whether or not the code representing binary data indicating eight kinds of colors, namely, W (white), BK (black), R (red), G (green), B (blue), Y (yellow), M (magenta) and C (Cyan) (hereunder sometimes referred to as binary eight-color data).

A code represented by PostScript language and used for establishing a color is setcmykcolor code. However, if the received code is represented as 0.3 0.4 0 0 setmykcolor, the density of cyan is set as 0.3 times the maximum density thereof; that of magenta 0.4 times the maximum density thereof; and those of yellow and black 0. Namely, in such a case, each of cyan and magenta has halftone levels and thus the received code is not binary eight-color data. In contrast, if the received code is represented as 1 0 1 0 setmykcolor, the density of each of colors cymk (namely, cyan, yellow, magenta and black) is set as 0 or 1. Thus the received code is binary eight-color data.

Figure 4:
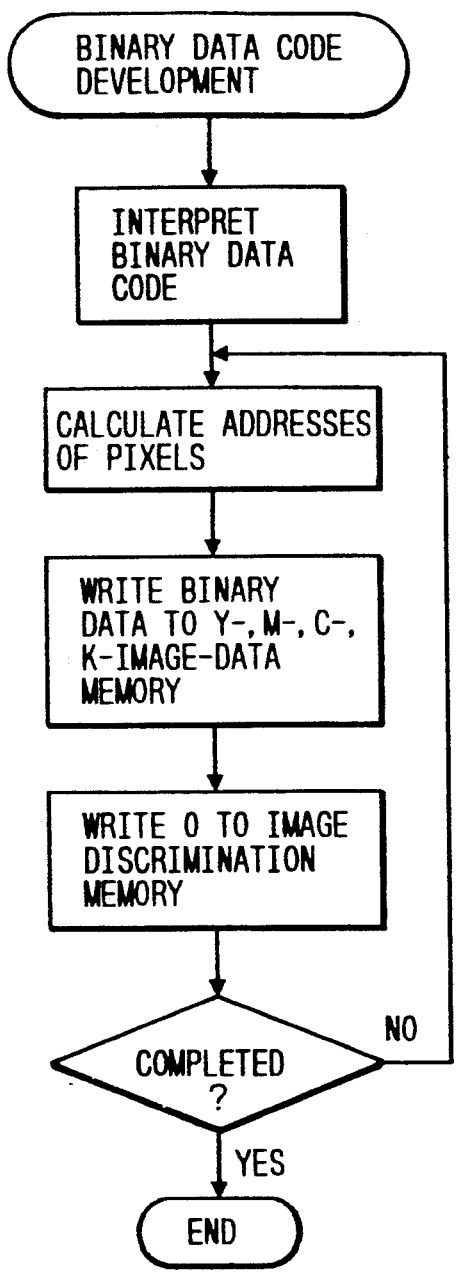
FIG. 4 is a flowchart for illustrating a binary-image data development processing performed in the image processing system employing the present invention.

Subsequently, in step S33, if the received code is binary eight-color data, image data are generated from the received code by performing the process of FIG. 4 such that the image data are binary and are printed at the resolution of 300 dpi, which is equal to that of the printer engine. Further, the binary image data corresponding to each pixel is stored at each bit. Such image data are written to the image data memory 13 (hereunder sometimes referred to as Y-, M-, C- and K-image-data memories) respectively corresponding to four colors Y, M, C and K. The binary image data of 4 pixels are represented by using 4 bits. Furthermore, a value of 0, which indicates that the image data stored at each bit of the image data memory 13 is binary data, is written to the image discrimination memory 14 correspondingly to an address, at which the image data of each pixel is stored, of the image data memory 13.

Figure 5:
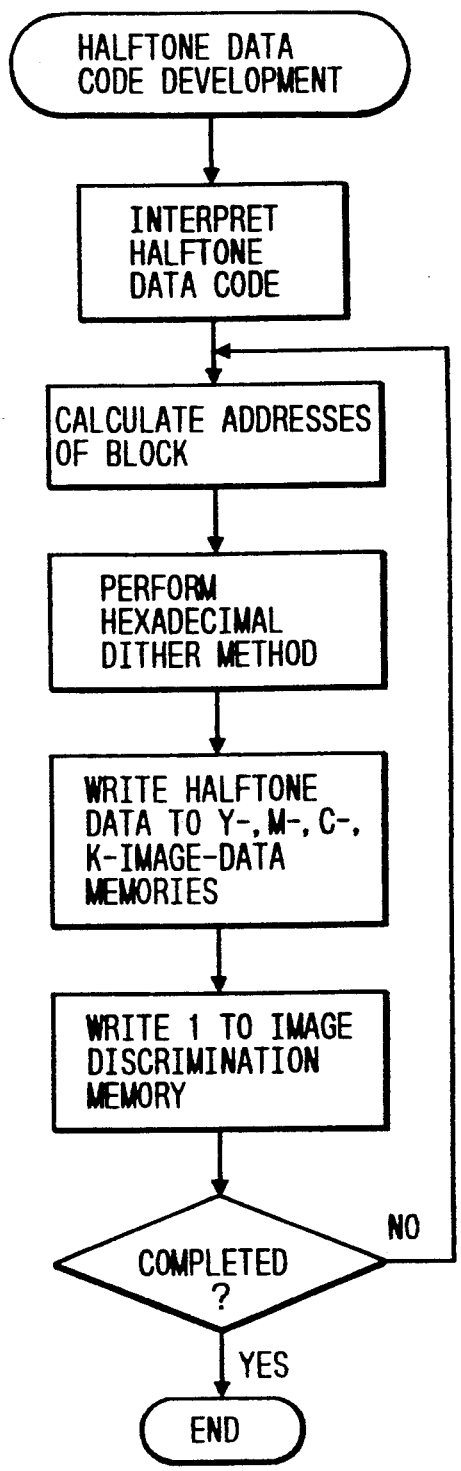
FIG. 5 is a flowchart for illustrating a halftone-image data development processing performed in the image processing system employing the present invention.

If it is found in step S32 that the received code is not binary eight-color data but is halftone color data (namely, multi-level color data), addresses of the memory, at which image data of a block (namely, a pixel) to be generated is stored, are calculated by performing the process of FIG. 5. Then, data represented by the code are converted to 8-bit data representing tone-levels of pixels, which may have 256 tone-levels, correspondingly to each of the four colors Y, M, C and K. Further, the 8-bit data are compressed into 4-bit data, which represents 16 tone-levels, by performing a 16-valued (or hexadecimal) dither method. Thus, image data are generated in such a manner that the image data are hexadecimal and are printed at the resolution of 150 dpi, which is equal to one-half that of the printer engine. The 16-valued or hexadecimal image data are represented by using 4 bits. Namely, the image data of each pixel is stored in a storage area comprised of 4 bits. The hexadecimal image data are written to each of the four-color image data memories (namely, each of the Y-, M-, C- and K-image-data memories) 13. Further, halftone image data of each pixel is represented by using 4 bits. Furthermore, a value of 1, which indicates that the image data stored at each bit of the image data memory 13 is halftone image data, is written to the image discrimination memory 14 correspondingly to an address, at which the image data of each pixel is stored, of the image data memory 13. The reason for setting the resolution of the image data as 150 dpi, which is one-half that of the binary eight-color image data, is that the density level of each pixel is represented by 1 bit in case of employing the binary eight-color image data, while that of each pixel is represented by 4 bits in case of employing the hexadecimal-level halftone image data and that namely, the amount of data required for representing the density level of a pixel in case of employing the hexadecimal-level halftone image data becomes four times that of data required for representing the density level of a pixel in case of employing the binary eight-color image data (namely, the number of bits required for representing the binary eight-color image data of 2×2 pixels is equal to that of bits required for representing the halftone image data of a pixel). For instance, if the density level of a pixel is 5, a binary value of 0101 is written to the image data memory 13.

The processing to be performed in each of the steps described hereinabove will be described hereinbelow more practically.

Figure 6:
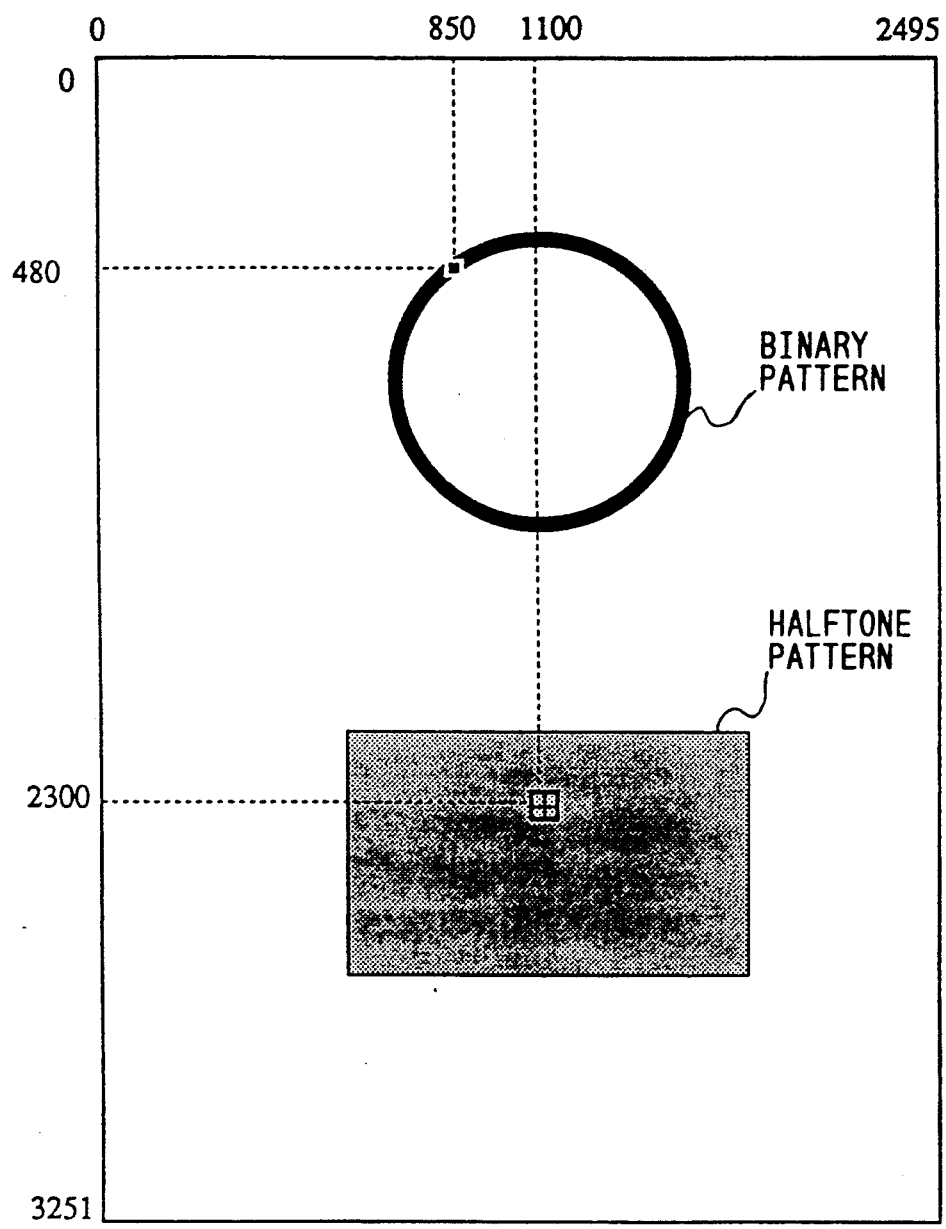
FIG. 6 is a diagram for illustrating image data developed or generated by the image processing system embodying the present invention.

FIG. 6 shows a circle represented by binary levels and a rectangular represented by halftone levels as examples of image patterns to be generated from codes. Hereinafter, it will be described how an image development of a block (namely, a pixel) of each of the patterns is performed, by way of examples. As shown in this figure, 2496 pixels are aligned in the horizontal line or direction of a picture array (hereunder sometimes referred to as a development area) and 3252 pixels are aligned in the vertical line or direction thereof. Namely, the development area has 2496 columns and 3252 rows or lines. Further, as shown in FIG. 6, Column No. ranges from 0 to 2495 and Line No. ranges from 0 to 3251. Further, it will be also described hereunder how image data obtained as results of the image development of a pixel, of which Column No. is 850 and Line No. is 480, of the binary image pattern and a block, the leftwardly and upwardly located pixel of which has Column No. 1100 and Line No. 2300, of the halftone image pattern are written to the image data memory and the image discrimination memory.

Figure 7:
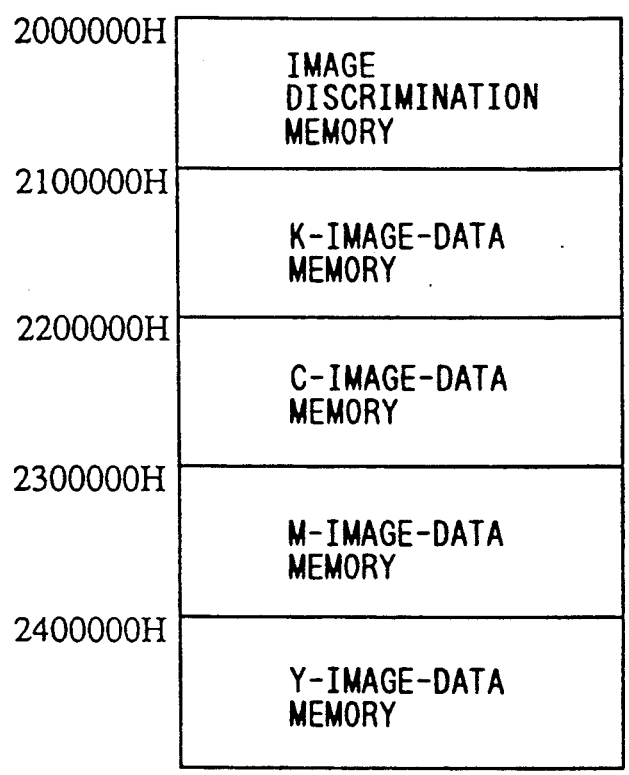
FIG. 7 is a diagram for illustrating a memory map of an image memory of the image processing system embodying the present invention.

FIG. 7 is a memory map of the image memory. The memory capacity of each of the Y-, M-, C- and K-image-data memories and the image discrimination memory, in each of which image data of a block (i.e., a pixel) is represented by using 1 bit, is 1 megabyte (MB). As shown in FIG. 7, addresses of locations of the image discrimination memory range from 2000000H to 20FFFFFH. Incidentally, in the instant application, the character H written in the right side of a numeral indicates that the numeral is hexadecimal. Similarly, addresses are assigned to locations of each of the Y-, M-, C- and K-image-data memories in this order as illustrated in FIG. 7.

FIG. 8 illustrates how binary image data of the indicated pixel of the binary image pattern are written to the image memory. The offset address of this pixel is calculated as follows:

480×2496+850=1198930 (in units of bit).

Incidentally, as is seen from this figure, each location, to which an address is assigned, has a storage area of 32 bits. Therefore, the offset address of this pixel corresponds to 18th bit of an address 2496AH. Thus corresponding image information on this pixel, which is represented by using 1 bit, is written to 18th bit of each of addresses 202496AH, 212496AH, 222496AH, 232496AH and 242496AH, which are obtained by adding 2496AH to the base address of each of the image discrimination memory and the K-, C-, M- and Y-image-data memories. If the binary image pattern is colored black, a value of 0 is written to the 18th bit of each of the addresses 202496AH, 222496AH, 232496AH and 242496AH, which are included in the image discrimination memory and the C-, M- and Y-image-data memories, respectively. Further, a value of 1 is written to the 18th bit of the address 212496AH of the K-image-data memory.

FIG. 9 illustrates how image data of the indicated block of the halftone image pattern (namely, the multi-level image pattern) are written to the image memory. The offset address of the leftwardly and upwardly located pixel of this block is calculated as follows:

2300×2496+1100=5741900 (in units of bit).

Therefore, the offset address of the leftwardly and upwardly located pixel of this block corresponds to 12th bit of an address AF3A9H. Similarly, those of the other pixels of the entire block correspond to 13th bit of the address AF3A9H and 12th and 13th bits of an address AF4E1H, respectively. Thus corresponding image information on the pixels of this block, which is represented by using 4 bits, is written to 12th and 13th bits of each of addresses, which are obtained by adding AF3A9 or AF4E1H to the base address of each of the image discrimination memory and the K-, C-, M- and Y-image-data memories. In case where the intensity levels of black, cyan, magenta and yellow of the indicated block are 0, 5, 0 and 8 in decimal notation, respectively, a value of 1, which indicates that a corresponding bit is a halftone pixel, is written to each of the four bits, namely, the 12th and 13th bits of the addresses 20AF3A9H and 20AF4E1H of the image discrimination memory. Further, the intensity levels of black, cyan, magenta and yellow, each of which is represented in binary notation, are written to the four bits of each of the K-, C-, M- and Y-image-data memories. For instance, the intensity level (namely, 8 in decimal notation) of yellow of the block is 1000 in binary notation and written to the 12th and 13th bits of the addresses 22AF3A9H and 22AF4E1H as illustrated in FIG. 9.

Moreover, when an image data file is stored in the image memory, the following procedure is carried out in order to reduce necessary memory capacity.

(1) Original image data of pixels of an input image are first partitioned according to the positions, at which the pixels are actually printed, into square blocks, each of which has 2×2 pixels. Then, a processing is performed on each of the blocks.

(2) It is then determined whether or not the original image data of pixels of each block are binary eight-color image data corresponding to one of the eight colors (namely, W (white), BK (black), R (red), G (green), B (blue), Y (yellow), M (magenta) and C (cyan).

(3) If all of the original image data of a block are binary eight-color image data, the original image data are developed to image data of the format to be stored in the image memory. Then, the image data obtained by the image development representing two-levels of the pixels at the resolution of 300 dpi are stored in the image data memory 13. Further, image discrimination data represented by 1 bit (hereunder sometimes referred to as image discrimination bit), which indicates a kind of image (namely, a binary image or a halftone image) is stored in the image discrimination memory 14.

(4) If the original image data of at least one pixel of the block is not binary image data but is halftone image data (namely, multi-level image data), it is determined that the block is of a halftone color image. Further, the following processing is performed on the original image of the block. If the original image data of each of the pixels is 24-bit data consisting of 8-bit data representing the intensity levels of R (red), 8-bit data representing the intensity levels of G (green) and 8-bit data representing the intensity levels of B (blue), a signal representing the original image data is converted into a signal representing 32-bit data composed of four 8-bit data respectively corresponding to four printing colors (namely, C, M, Y and BK) to be used by the printer. Subsequently, the 32-bit data are converted into 16-bit data, which is comprised of four 4-bit data respectively corresponding to the four printing colors, by performing the 16-valued dither method. The four 4-bit data are written to the C-, M-, Y- and K-image-data memories of the image data memory 13, respectively. Further, a value of 1 is set at the image discrimination bit of the image discrimination memory 14 corresponding to each of the pixels.

As a result of repeatedly performing such a processing on all of the blocks, the original image data of the entire input image are developed. Further, the image data obtained as the result of image development are written to the image memory comprised of the image data memory 13 and the image discrimination memory 14. When a printer code representing an end of a page is received, the writing of the image data to the image memory is finished. Further, if the printer engine 3 is ready to print, a printing of the image data is started. At that time, instead of sending the image data of each of the C-, M-, Y- and K-image-data memories of the image data memory 13 to the printer engine without change thereof, the processings to be effected in the image expansion portion 15 and the tone processing portion 16 of the present invention are performed on the image data. Then, a signal representing the image data thus processed is sent through the engine interface 17 to the printer engine as the image recording signal 6.

In the above described processing, each time when the image data respectively corresponding to the four printing colors C, M, Y and BK are written to the image memory, a signal (hereunder sometimes referred to as an image discrimination bit signal) representing the image discrimination bit is written to the image discrimination memory by a central processing unit (CPU) of the system by performing software. Hereinafter, an example of hardware (hereunder sometimes referred to as a writing-data-to-discrimination-memory device) for automatically performing the writing of the image discrimination bit signal to realize a faster image development processing will be described by referring to FIGS.

Figure 10:
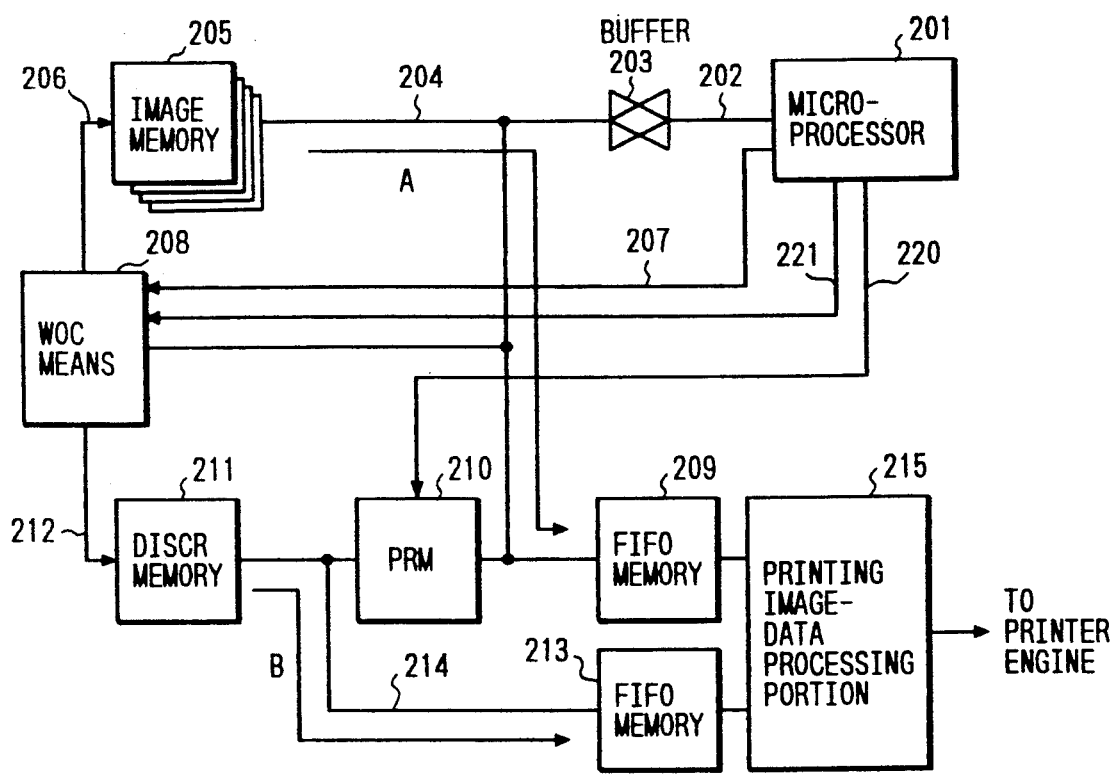
FIG. 10 is a schematic block diagram for illustrating the configuration of a device for writing data to an image discrimination memory of the image processing system embodying the present invention.
Figure 12:
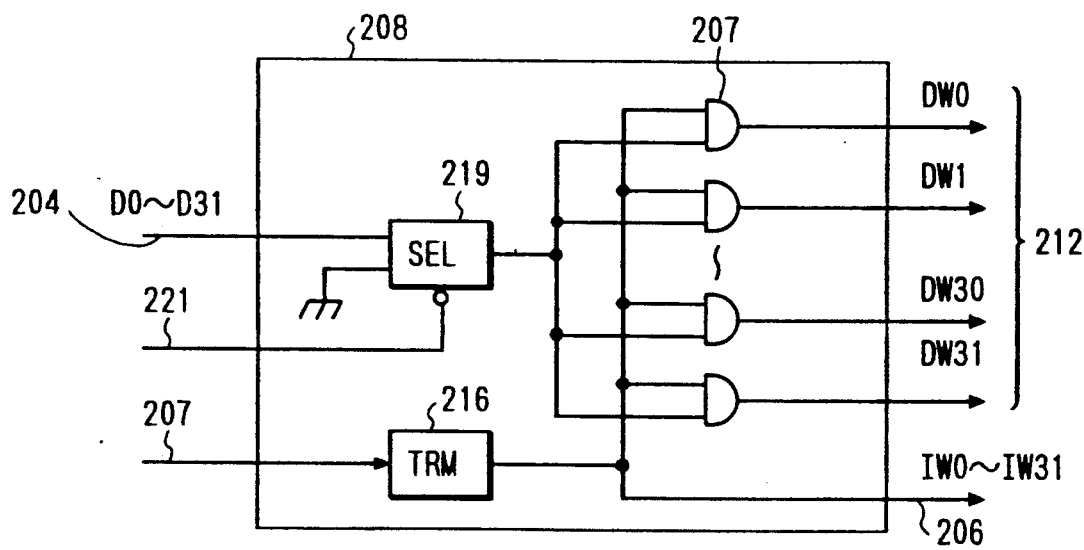
FIG. 12 is a diagram for illustrating the configuration of a control means for controlling the operation of writing data to the image discrimination memory of the image processing system embodying the present invention.
Figure 13:
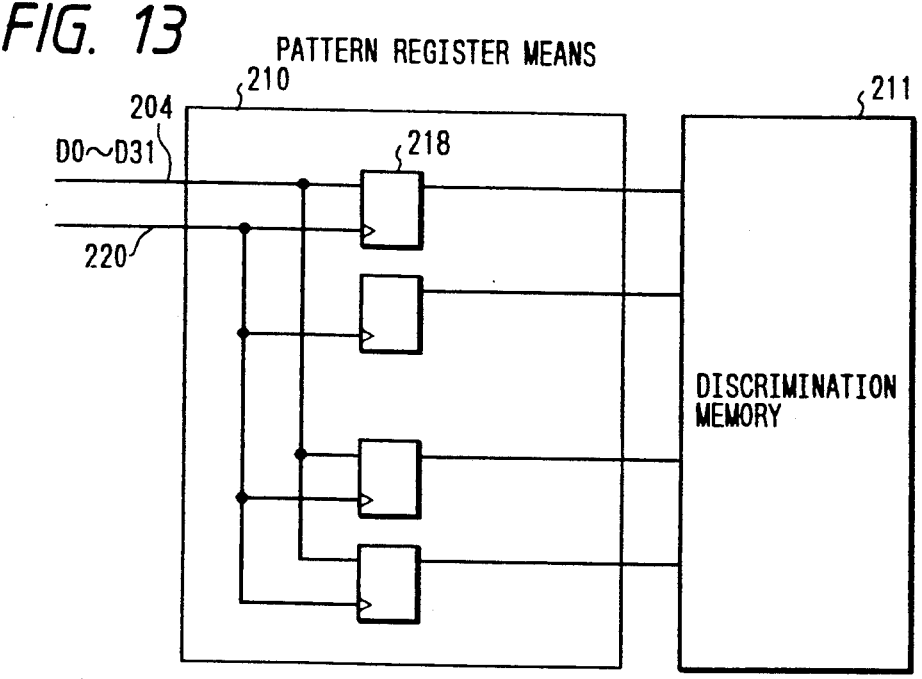
FIG. 13 is a schematic block diagram for illustrating the configuration of a pattern register connected to the image discrimination memory of the image processing system embodying the present invention.

10 to 13. FIG. 10 shows the composing elements of the hardware. Namely, reference numeral 201 denotes a microprocessor employed as an indicating means; 202 a data bus connected to the microprocessor 201; 203 a buffer; 204 an image memory data line connected to an image data memory (hereunder often referred to simply as an image memory) 205, a writing-operation control means 208, a pattern register means 210 and a first-in first-out (FIFO) memory 209. Reference numeral 206 designates a writing-data-to-image-memory control line; 212 writing-data-to-discrimination-memory control lines for transmitting a signal used to control the writing of data to the discrimination memory 211; and 207, 220 and 221 control lines for control by the microprocessor. Reference numeral 213 designates an FIFO memory connected to the discrimination memory 211 through a discrimination memory data line 214; and 215 a printing image-data processing portion. FIG. 12 schematically illustrates the configuration of the writing-operation control means 208. Reference numeral 216 denotes a write timing regulation means for regulating the time at which data are written to the image memory 205 and the discrimination memory 211; 217 AND gates; 219 a selector, the output of which is selected under the control of the microprocessor 201 through a control line 221. FIG. 13 schematically illustrates the configuration of the pattern register means 210. Reference numeral 218 denotes a D-type flip-flop to which a clock used for latching data is supplied through a control line 220.

Hereinafter, an operation of the writing-data-to-discrimination-memory device will be described. First, the microprocessor 201 usually writes a signal having an "H" level (namely, a high voltage level) to the pattern register means 210. The signal having the "H" level is latched by the D-type flip-flops 218. Next, the microprocessor 201 causes the image memory 205 to store printing image data (i.e., original image data) input from various image input devices and or formed by performing application programs. At that time, first in case where the printing image data are character data representing characters, the selector 219 of the writing-operation control means 208 is set by the microprocessor 201 through the control line 221 in such a manner that an output of the selector 219 is fed to the image memory data line 204. Further, an output of the D-type flip-flop 218, which is latched by the pattern register means 210, is supplied to the discrimination memory 211. The character data to be stored in the image memory 205 are furnished by the microprocessor 201 through the data bus 202, the buffer 203 and the image memory data line 204 to the image memory 205. The character data are also supplied to the AND gates 217 of the writing-operation control means 208. Further, in the writing-operation control means 208, the time, at which a signal transmitted from the microprocessor 201 through the control line 207 is normally written to the image memory 205 and the discrimination memory 211, is controlled by the write timing regulation means 216. Thus the signal transmitted from the microprocessor 201 through the control line 207 is supplied to the AND gates 217 of the write-operation control means 208 and to the writing-data-to-image-memory control line 206. At that time, the character data are stored in the image memory 205 in response to a control signal passing through the control line 206. As above described, the signal having an "H" voltage-level is fed to the discrimination memory 211 through the discrimination memory data line 214.

However, signals, each of which has "H" voltage-level, are output from the AND gates 217, each of which receives a signal representing the character data selected by the selector 219 and the control signal sent from the write timing regulation means 216, only to the writing-data-to-discrimination-memory control lines 212 corresponding to bits at which the character data are present. Thus the signal having "H" level is written only to bits, at which the character data are present, of the discrimination memory 211. In contrast, the writing-data-to-discrimination-memory control lines 212 corresponding to bits, at which the character data are not present, do not become active. Therefore, no signals are written to bits, at which the character data are not present, of the discrimination memory 211, in spite of the fact that a signal having "H" level is supplied to the discrimination memory data line 214.

Meanwhile, in case where the printing image data are image data, the selector 219 is set by the microprocessor 201 through the control line 221 in such a manner that an output of the selector 219 disables the AND gates 217. The image data to be stored in the image memory 205 are supplied by the microprocessor 201 through the data bus 202, the buffer 203 and the image memory data line 204 to the image memory 205. The image data are also supplied to the writing-operation control means 208. At that time, the image data are stored in the image memory 205 in response to a control signal passing through the control line 206. As above described, the signal having an "H" voltage-level is fed to the discrimination memory 211 through the discrimination memory data line 214. However, the AND gates 217 are disabled as above described, so that all of the control lines 212 are inactive. As the result, no signals are written to the discrimination memory 212. Thus, if the level indicated by the pattern register means 210 is set by the microprocessor 201 as "L" level (namely, a low level) and the discrimination memory 211 is cleared in a mode, in which character data are written thereto, before the printing image data are written to the image memory 205, the signal having "H" level (hereunder often referred to as data "H") is written to each bit corresponding to the character data and the signal having "L" level (hereunder often referred to as data "L") is written to each bit corresponding to the image data. Consequently, the character data can be discriminated from the image data.

Figure 11:
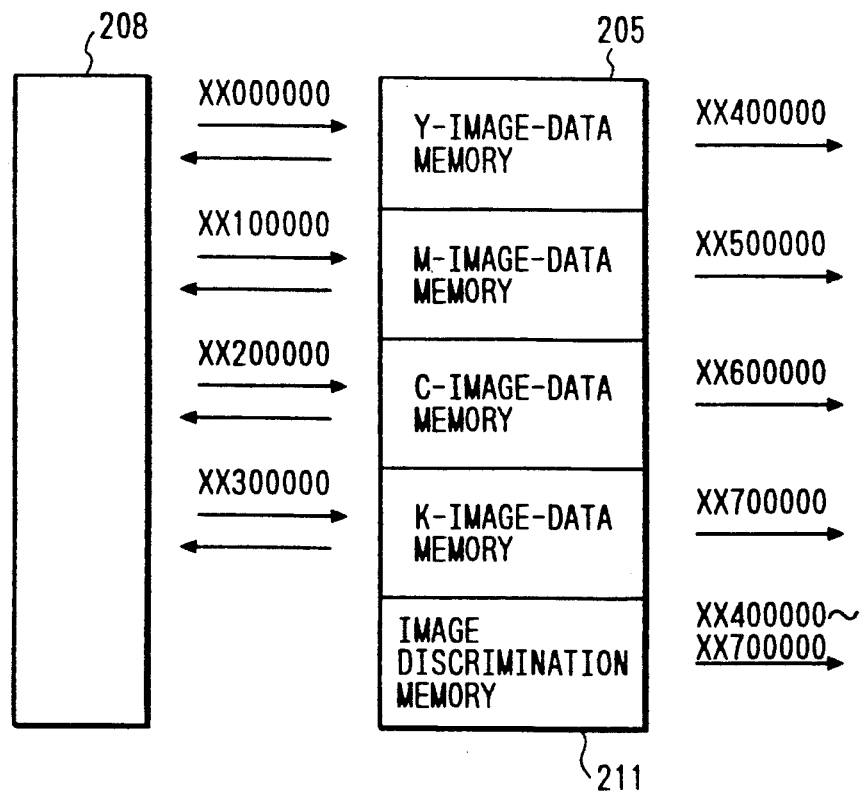
FIG. 11 is a diagram for illustrating an operation of writing data to the image discrimination memory of the image processing system embodying the present invention.

Next, it will be described hereinbelow by referring to a memory map (i.e., an address map) of FIG. 11 how addresses assigned to locations of a memory including the image memory and the discrimination memory are used to perform processings (to be described later) in the printing image-data processing portion 215 on the printing image data stored in the image memory 205 and the discrimination information stored in the discrimination memory 211. As illustrated in this figure, addresses XX000000 to XX300000 (incidentally, X denotes a predetermined hexadecimal number) are accessed to store the printing image data (i.e., the original image data). However, addresses XX400000 to XX700000 are accessed or used to perform the processings of the printing image data and the discrimination information in the printing image-data processing portion 215. The printing image data read from the image memory are transmitted to the FIFO memory 209 through the image-memory-data line 204 as shown in FIG. 5(A). In contrast, the discrimination information read from the discrimination memory is transferred to the FIFO memory 213 through the discrimination memory data line 214 as shown in FIG. 10(B). Thus the character data and the image data, which are included in the printing image data, are supplied from the FIFO memory 209 to the printing image-data processing portion 215, in which, for example, a smoothing processing is performed on the character data and, for instance, an interpolation processing is performed on the image data, at the time suitably regulated in such a fashion to coordinate with an operation of outputting processed data from the printing image-data processing portion to the printer engine. Similarly, the discrimination information is fed from the FIFO memory 213 to the printing image-data processing portion 215 at the appropriately regulated time.

As is apparent from the foregoing description, the system having the discrimination memory as above constructed can simultaneously effect a storing of the discrimination information in the discrimination memory and a storing of the printing image data in the image memory without putting an extra load on the microprocessor only by performing a simple setting of a selector by the microprocessor. Thereby, the system can perform the processing of the printing image data at a high speed even in case where both of the character data and the image data are included in the printing image data.

In the foregoing description, the operation of the writing-data-to-discrimination-memory device has been explained. Next, the image expansion portion 15, which changes the resolution and the intensity levels from those indicated by the data or information stored in the image discrimination memory 14 and the image data memory 13 of FIG. 2 and performs processings for improving picture quality of characters and a line drawing represented by binary data, will be described hereinbelow.

In the image expansion portion 15, image data respectively corresponding to colors are expanded in the order of the colors correspondingly to operations of the printer engine 3 of FIG. 1. Namely, the image data respectively corresponding to the colors BK, C, M and Y are printed in this order. Image recording signals required for printing the image data corresponding to the color BK are synthesized (namely, formed) by using only the image data corresponding to the color BK, which are stored in the image data memory 13, and the information stored in the image discrimination memory 14. Thus the image data respectively corresponding to the colors C, M and Y are unnecessary for forming the image recording signals required to print the image data corresponding to the color BK. Similarly, image signals required for printing the image data corresponding to each of the colors C, M and Y are formed by using only the corresponding image data stored in the image data memory 13 and the information stored in the image discrimination memory 14. Thus the image expansion portion 15 can perform an expansion processing on the image data corresponding to each of the color by using only the corresponding image data stored in the image data memory 13 and the corresponding information stored in the image discrimination memory 14.

Figure 14:
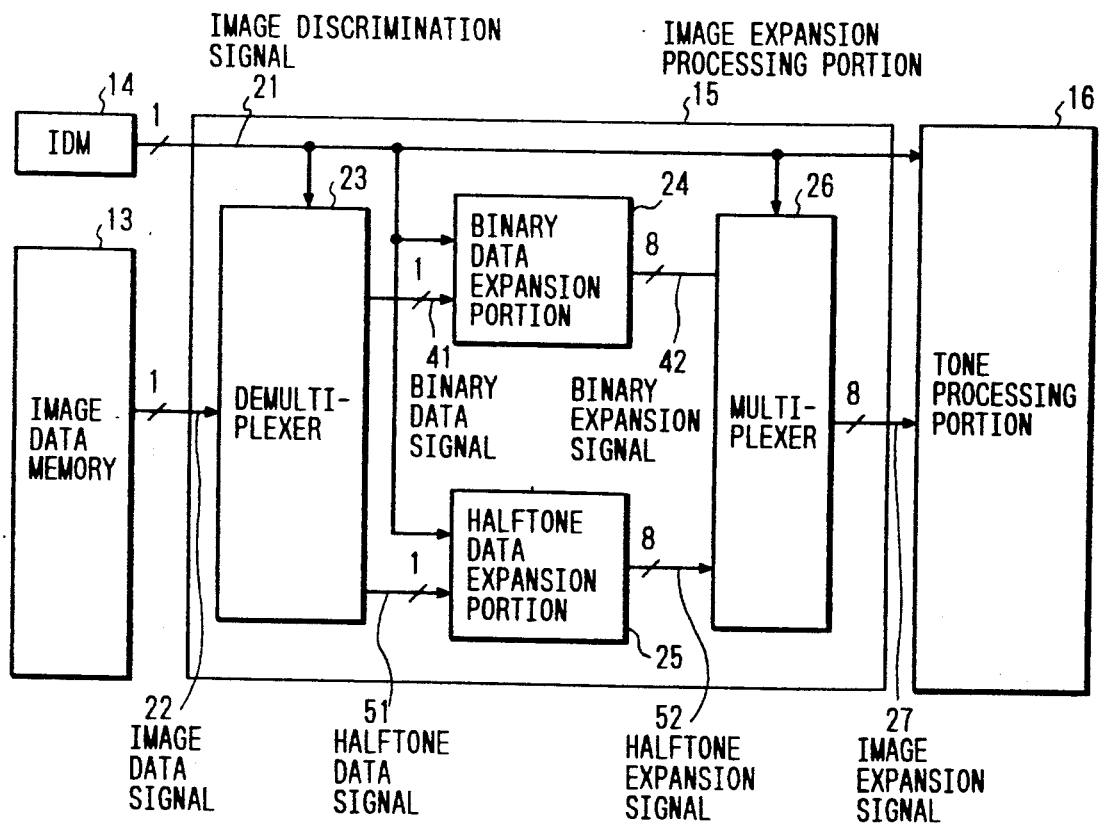
FIG. 14 is a schematic block diagram for illustrating the configuration of an image expansion portion of the image processing system embodying the present invention.

FIG. 14 is a schematic block diagram for illustrating the configuration of the image expansion portion 15. Image data represented by an image data signal 22 output from the image data memory 13 are split into binary image data and halftone image data in a demultiplexer 23 according to an image discrimination signal 21 output from the image discrimination memory 14. The binary image data are processed in a binary data expansion portion 24, while the halftone data are processed in a halftone data expansion portion 25. Thereafter, an image expansion signal 27 is synthesized by a multiplexer 26 from outputs of the binary data expansion portion 24 and of the halftone data expansion portion 25.

Then, the image expansion signal 27 is sent to the tone processing portion 16 as a signal representing image data, which have the resolution of 300 dpi and 256 intensity levels (or gray levels).

As above stated, the image data signal 22 is converted by the demultiplexer 23 into a binary data signal 41, which represents only binary image data extracted from the image data represented by the image data signal 22, and a halftone data signal 51 which represents only halftone image data extracted from the image data represented by the image data signal 22.

The binary data expansion portion 24 not only converts binary data, which are represented by the binary data signal 41 and have the resolution of 300 dpi, into the signal representing image data, which have the resolution of 300 dpi and 256 intensity levels, but also perform a smoothing of edge portions of characters and line drawings represented by binary data. Then, the binary data expansion portion 24 outputs a binary data expansion signal 42 to the multiplexer 26.

Further, the halftone data expansion portion 25 not only converts 16-level data, which are represented by the halftone data signal 51 and have the resolution of 150 dpi, into the signal representing image data, which have the resolution of 300 dpi and 256 intensity levels, but also perform a reproducing of a halftone level of a pixel by using information on image data of adjacent pixels. Then, the halftone data expansion portion 25 outputs a halftone data expansion signal 52 to the multiplexer 26.

Subsequently, the multiplexer 26 synthesizes the image expansion signal 27 from the binary data expansion signal 42 and the halftone data expansion signal 52 and outputs the image expansion signal 27 to the tone processing portion 17.

Figure 15:
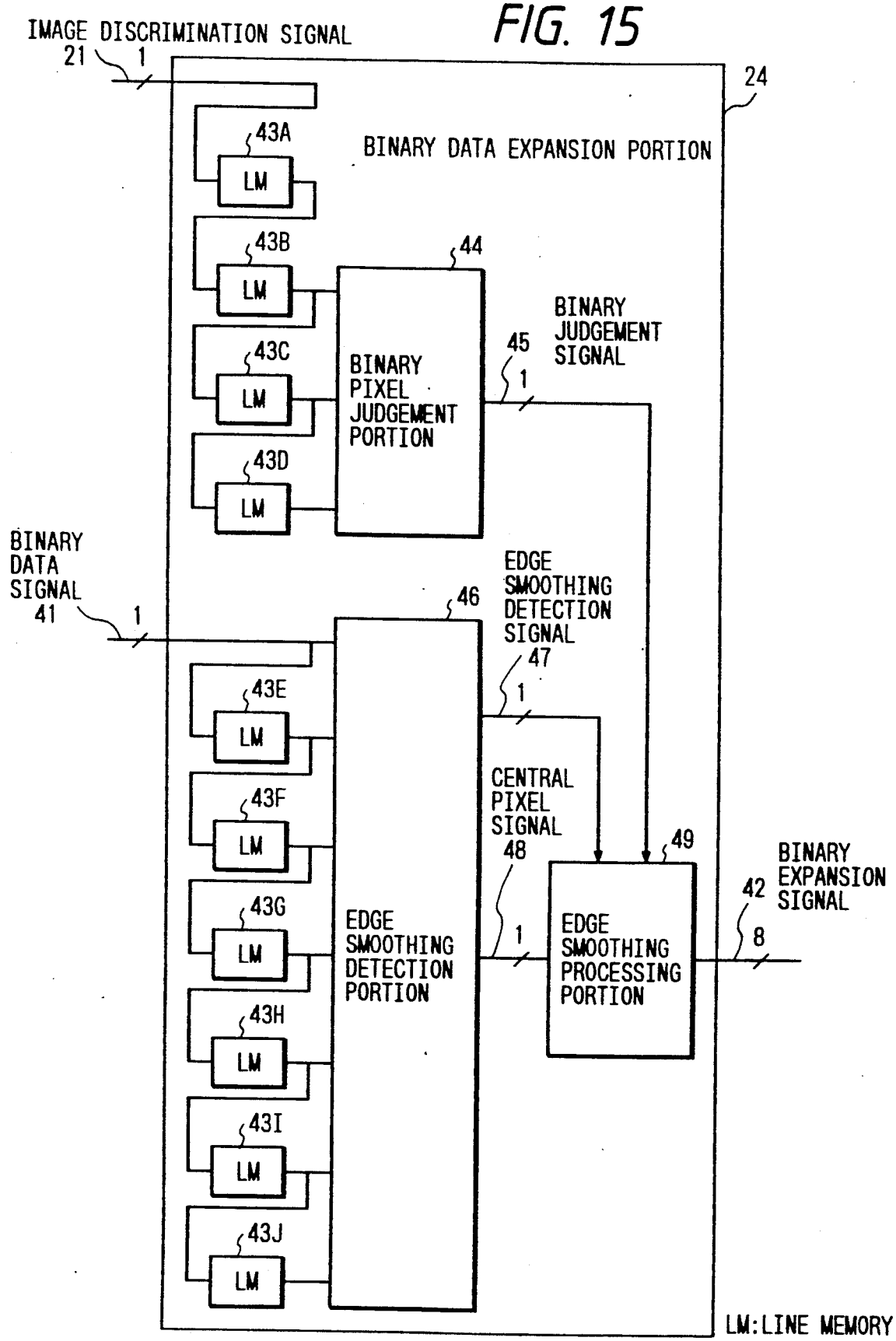
FIG. 15 is a schematic block diagram for illustrating the configuration of a binary data expansion portion of the image processing system embodying the present invention.

FIG. 15 shows the configuration of the binary data expansion portion 24. As shown in this figure, the image discrimination signal 21 and the binary data signal 41 output from the multiplexer 23 are input to the binary data expansion portion 24. Further, the portion 24 outputs the binary data expansion signal 42.

In the portion 24, a checking of image discrimination information represented by the image discrimination signal 21 is performed according to image discrimination information of 3×3 pixels of a binary image window composed of 7×7 pixels. In contrast, a wide window is necessary to determine whether or not an edge smoothing processing should be performed on the binary data represented by the binary data signal 41. Thus, in this portion, a window consisting of 7×7 pixels is used for the determination.

To form the image window, which is comprised of 3×3 central pixels, for checking the image discrimination information, line memories 43A to 43D are used. In the binary pixel judgement portion 44, it is determined by checking image discrimination information of the 3×3 pixels whether or not all of data of the pixels of the window are binary data. A binary pixel discrimination signal 45, which represents 1-bit data indicating the result of the determination, is output from the portion 44. In addition, if data of a pixel of the window are not binary, the signal 45 represents 0. If all of data of the pixels of the window are binary data, the signal 45 represents 1.

Moreover, to form the image window composed of 7×7 pixels to be used for determining whether or not an edge smoothing processing should be performed on the binary data represented by the signal 41, necessary binary image data are input from line memories 43E to 43J to an edge smoothing detection portion 46, whereupon such a determination is made. Then, an edge smoothing detection signal 47 and a central pixel signal 48 are output from the portion 46 to an edge smoothing processing portion 49.

Figures 40, 41:
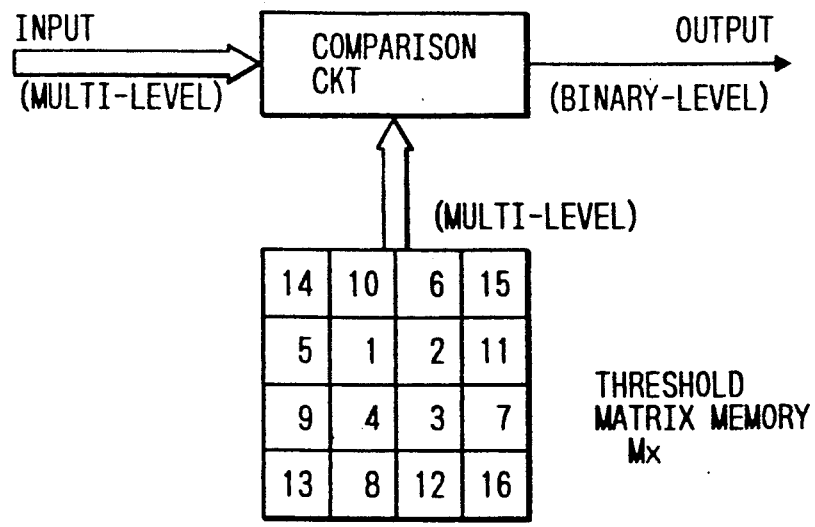
FIG. 40 is a schematic block diagram for illustrating the configuration of a conventional image processing system employing the binary dither method.
FIG. 41 is a table for showing the relation between logical data represented by binary pixel discrimination signal and smoothing detection signal in the edge smoothing processing portion of the image processing system employing the present invention.

As is seen from a table of FIG. 41, the edge smoothing processing portion 49 is controlled according to the binary pixel discrimination signal 45 and the edge smoothing detection signal 47 to convert the intensity level indicated by the central pixel signal 48. As shown in FIG. 41, only in case where both of the binary pixel discrimination signal 45 and the edge smoothing detection signal 47 indicate 1 (namely, only in case where all of the data of the pixels of the window are binary data and an edge smoothing processing is necessary), the intensity levels indicated by the binary data signal (namely, the central pixel signal) are converted into middle levels. Thus the edge smoothing is performed on edges of the image represented by the binary data.

Figure 16:
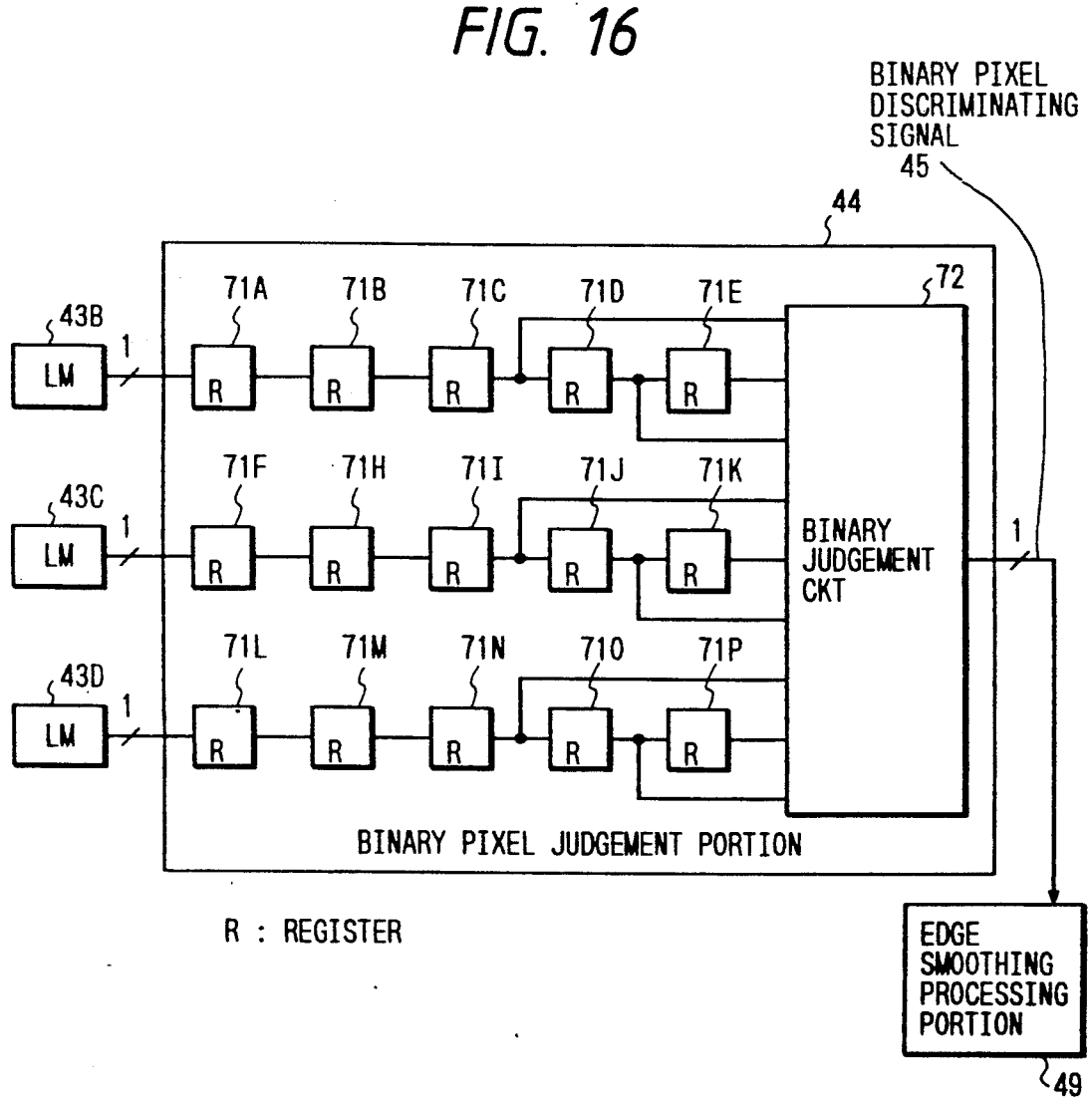
FIG. 16 is a schematic block diagram for illustrating the configuration of a binary pixel discrimination portion of the image processing system embodying the present invention.

FIG. 16 shows the configuration of the binary pixel judgement portion 44. First, a window consisting of 5×3 pixels is formed according to image discrimination information of three lines input from the line memories 43B to 43D by using registers 71A to 71P. Then, the image discrimination information of 3×3 pixels of the window is extracted therefrom. Subsequently, it is determined by a binary judgement circuit 72 whether or not all of the data of the 3×3 pixels are binary data. Upon completion of the determination, the circuit 72 outputs a binary judgement signal 45 representing 1-bit data indicating a result of the judgement.

Figure 17:
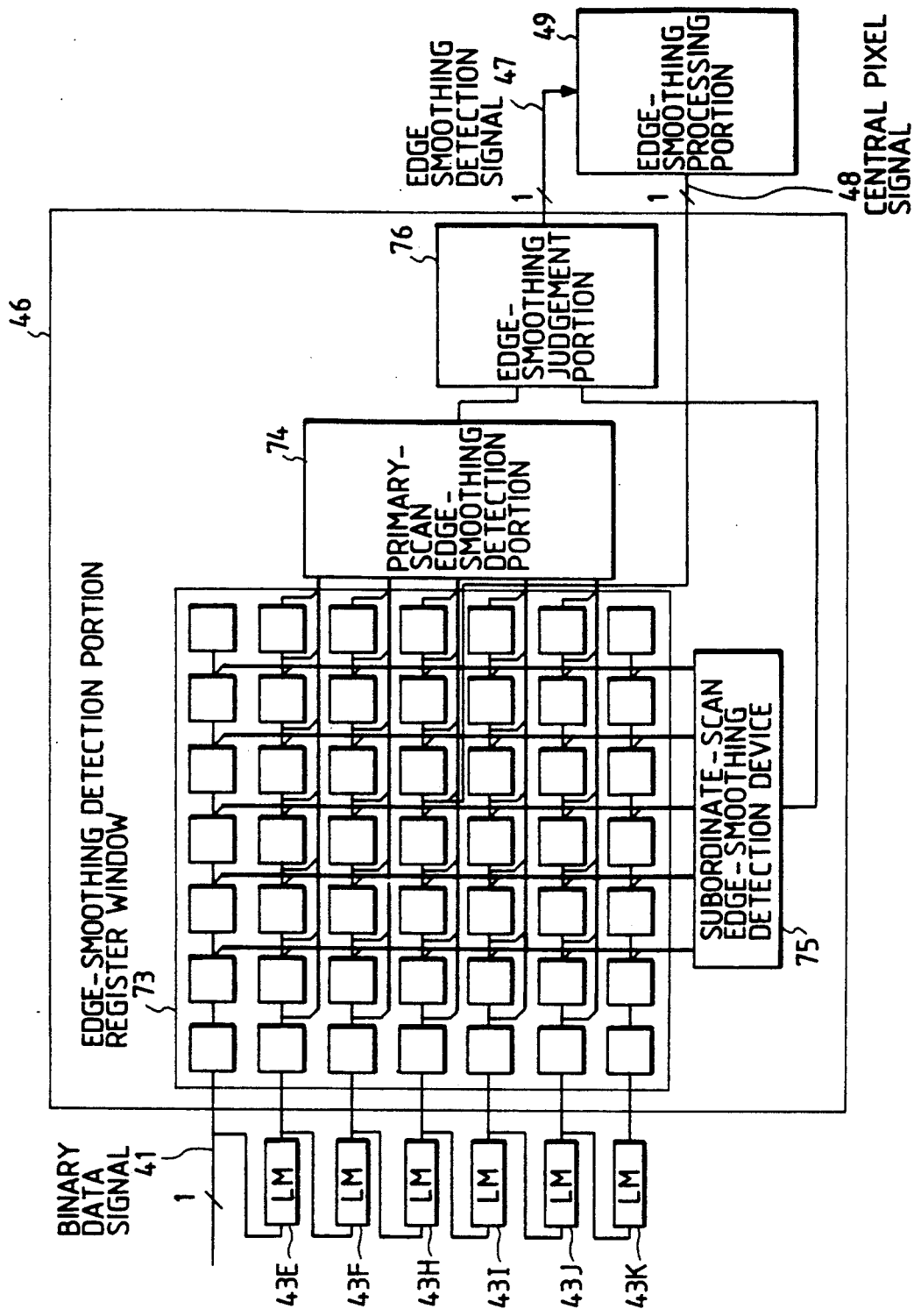
FIG. 17 is a schematic block diagram for illustrating an edge-smoothing detection portion of the image processing system embodying the present invention.

FIG. 17 shows the configuration of the edge smoothing detection portion 46. A window comprised of 7×7 pixels is formed by a register window 73 from the data represented by the binary data signal 41 and the binary data of 7 lines output from the line memories 43E to 43J. Then, each of a primary-scan edge-smoothing detection device 74 and a subordinate-scan edge-smoothing detection device 75 determines whether or not an edge smoothing processing should be performed on the corresponding binary data. Furthermore, an edge-smoothing judgement portion 76 synthetically determines whether or not an edge smoothing processing should be performed on the binary data. As the result, the portion 46 outputs the edge smoothing detection signal 47 and the central pixel signal 48.

Figure 18:
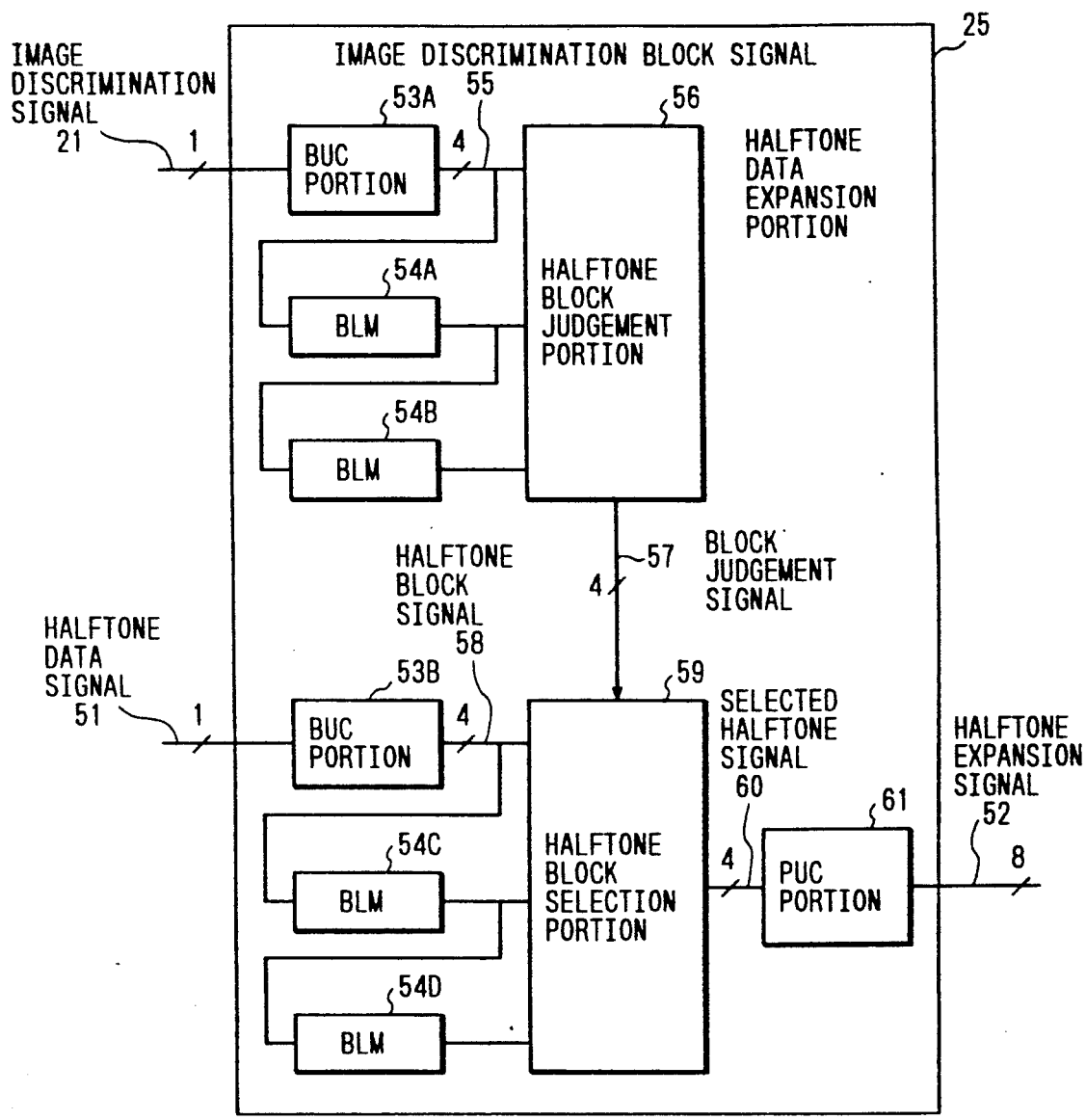
FIG. 18 is a schematic block diagram for illustrating a half-tone data detection portion of the image processing system embodying the present invention.

FIG. 18 shows the configuration of the halftone data expansion portion 25. As shown in this figure, the image discrimination signal 21 and the halftone data signal 51 output from the demultiplexer 23 are input to the portion 25. The image discrimination signal 21 representing 1-bit image discrimination information of each pixel is converted by a block-unit conversion portion 53A into an image discrimination block signal 55 representing 4-bit data corresponding to each block having 2×2 pixels.

In case where pixels corresponding to binary data (hereunder referred to as binary data pixels) and pixels corresponding to halftone data (hereunder referred to as halftone data pixels) coexist in a block of pixels having image data, the intensity level of an adjacent halftone block is copied as the intensity level of the halftone data pixel because the density level of the halftone data pixel of a block cannot be reproduced only from information on the image data of the same block. A halftone block judgement portion 56 forms a window consisting of 3×3 blocks by using an image discrimination block signal 55 and two block line memories 54A and 54B and then determines which one of the blocks should be selected as a block, the intensity level of which is copied. Then, the portion 56 outputs a selected block signal (hereunder sometimes referred to as a block judgement signal) 57 representing 4-bit data which indicates the selected block.

On the other hand, the halftone data signals 51 are converted by a block-unit conversion portion 53B into halftone block signals 58 respectively indicating the intensity levels of blocks. A halftone block selection portion 59 forms a window consisting of 3×3 blocks by using the halftone clock signal 58 and block line memories 54C and 54D and outputs a selected halftone signal 60 representing the intensity level of the block indicated by the selected block signal (namely, the block judgement signal) 57.

A pixel-unit conversion portion 61 converts the selected halftone signal 60 representing 4-bit 16-level data, which indicate the intensity level of the selected one of blocks, into a resultant signal representing 8-bit 256-level data, which indicate the intensity levels of pixels of the selected block. Then, the portion 61 outputs the halftone data expansion signal 52 as the resultant signal.

Figure 19:
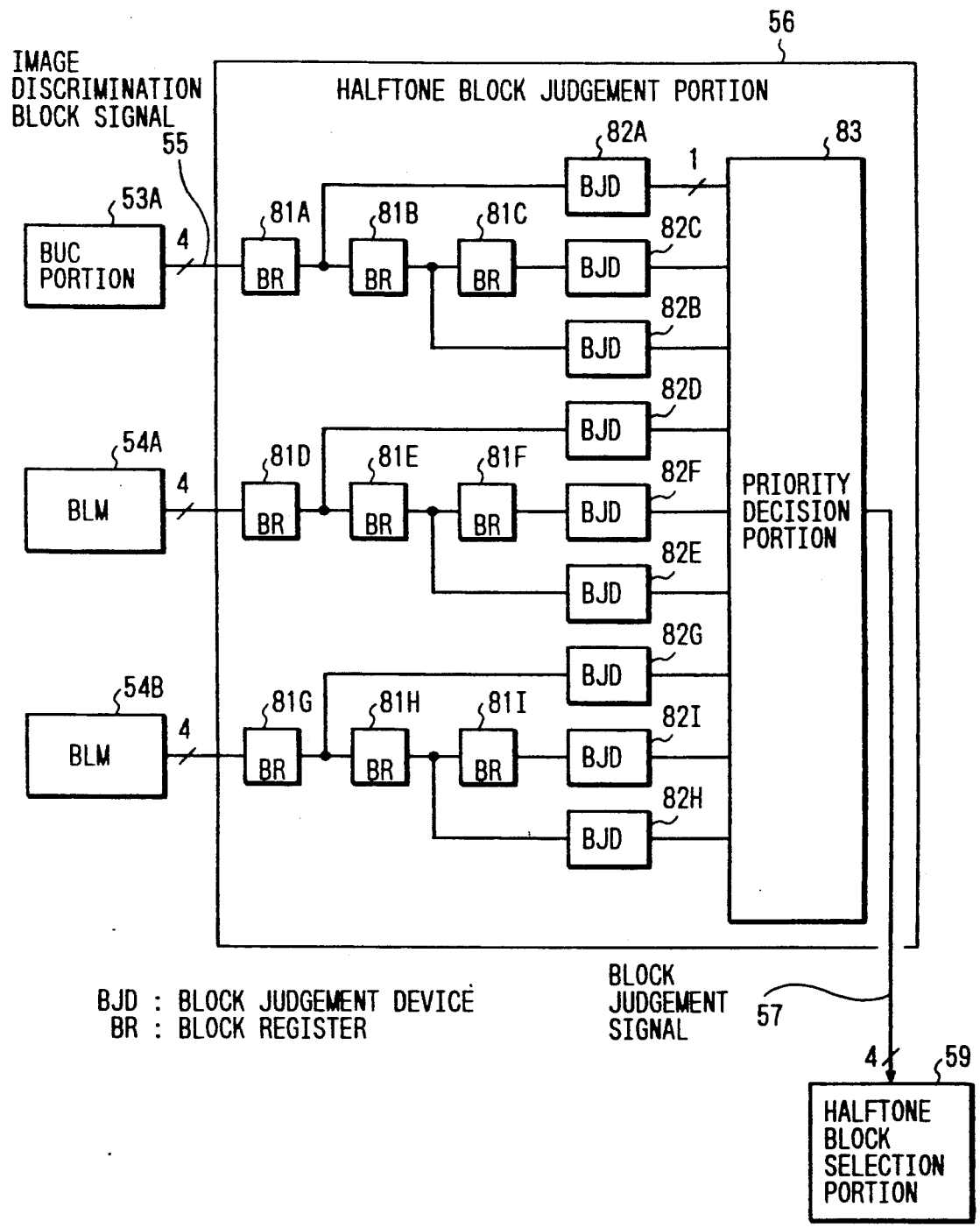
FIG. 19 is a schematic block diagram for illustrating a half-tone block discrimination portion of the image processing system embodying the present invention.

FIG. 19 shows the configuration of the halftone block judgement portion 56 which first forms the window consisting of 3×3 blocks from image discrimination information of three blocks represented by the image discrimination block signal 55 and output signals of the two block line memories 54A and 54B by using block registers 81A to 81I. Then, each of block judgement devices 82A to 82I determines whether or not all of image data of pixels of a block sent from a corresponding one of the block registers 81a to 81I are halftone data. Subsequently, a signal, which represents 1-bit data indicating the result of the determination, is output from each of the devices 82A to 82I to a priority decision portion 83. Incidentally, if data of at least one pixel of the block are binary data, the signal output from the device represents 0. If all of data of the pixels of the block are halftone data, the signal output from the device represents 1. The portion 83 outputs the block judgement signal 57 representing 4-bit data according to priorities as illustrated in FIG. 20.

Namely, as shown in this figure, the center block has a highest priority. A signal output from the block judgement device 82F corresponding to the center block indicates 1. In such a case, the priority decision portion 83 outputs the block judgement signal indicating 1. In contrast, when a signal output from the block judgement device 82F corresponding to the center block indicates 0 and a signal output from the block judgement device 82E corresponding to an adjacent block at the left side of the center block indicates 1, the priority decision portion 83 outputs the block judgement signal indicating 2. Thereafter, blocks, the corresponding block judgement signals of which indicate 1, are detected in the order of the priorities thereof. If all of the block judgement devices output signals indicating 0, the block judgement signal is set as indicating 0.

Figure 21:
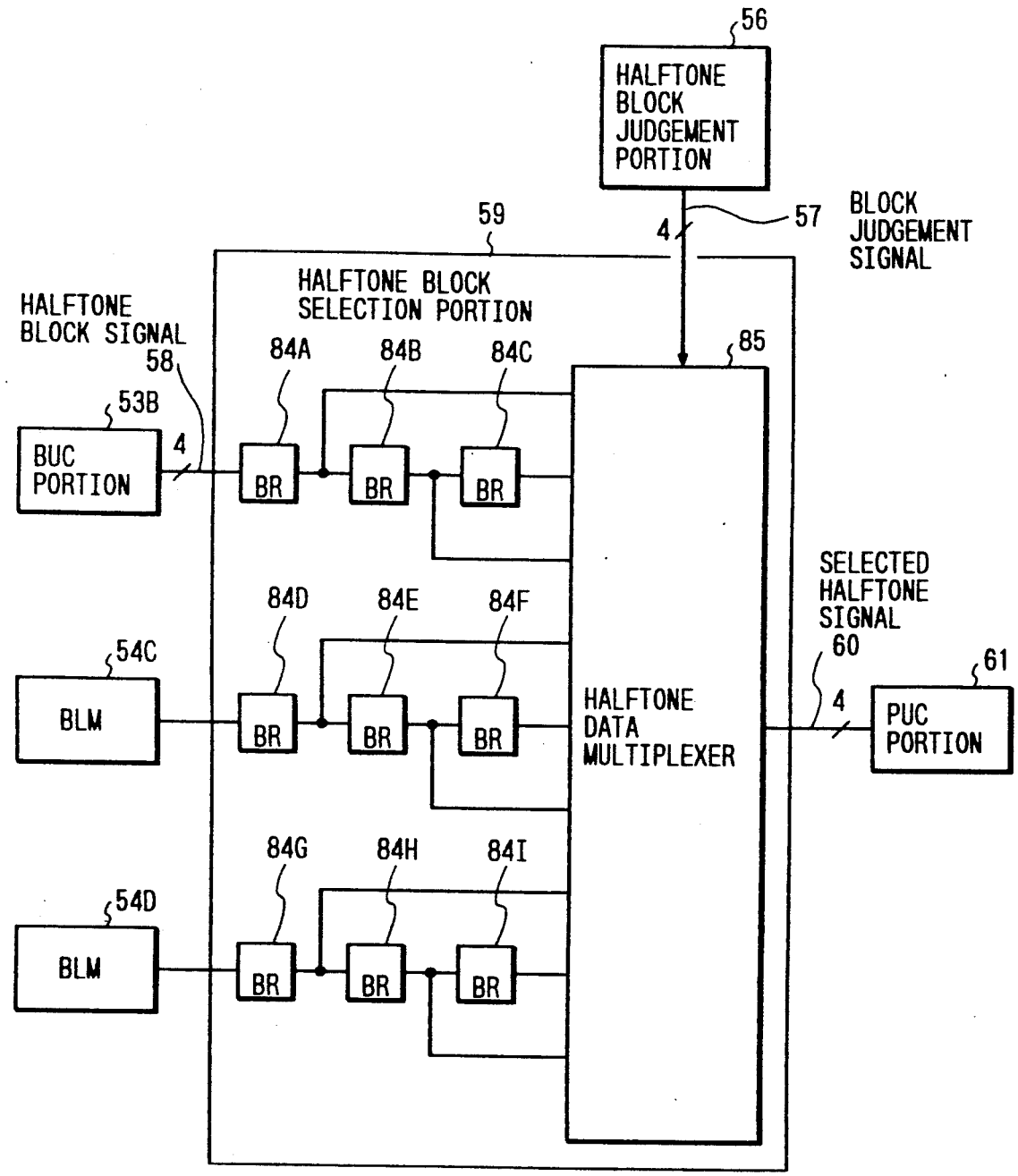
FIG. 21 is a schematic block diagram for illustrating a half-tone selection processing portion of the image processing system embodying the present invention.

FIG. 21 shows the configuration of the halftone block selection portion 59. The portion 59 first forms the window consisting of 3×3 blocks from halftone data or information of three block lines represented by the halftone block signal 58 and output signals of the two block line memories 54C and 54D by using block registers 84A to 84I. Then, a halftone data multiplexer 85 selects halftone data of the block indicated by the block judgement signal 57 and outputs the selected halftone signal 60.

FIGS. 22 to 30 illustrate the image-data expansion processing to be performed in the image expansion portion 15. FIGS. 22 to 24 illustrate the processing in case where all of image discrimination bits indicate 0 and namely all image data of pixels of a block are binary data. FIGS. 25 and 26 illustrate the processing in case where all of image discrimination bits indicate 1 and namely all image data of pixels of a block are halftone data. FIGS. 27 to 30 illustrate the processing in case where there are both of image discrimination bits indicating 0 and image discrimination bits indicating 1 and namely binary image data and halftone data of pixels of a block coexist.

FIG. 22(a) illustrates data stored in the image discrimination memory 14 in case where image data of all pixels are binary data. Thus all of the stored data are 0 (i.e., binary data). FIG. 22(b) illustrates data stored in the image data memory 13 in case where image data of all pixels are binary data. Pixels corresponding to 0 are not printed. Conversely, dots corresponding to pixels corresponding to 1 are completely printed. Because all of the image data are binary data, only data indicating 0 are sent to the halftone data expansion portion 25. Thus the image data are processed only in the binary data expansion portion 24.

Figures 23A, 23B:
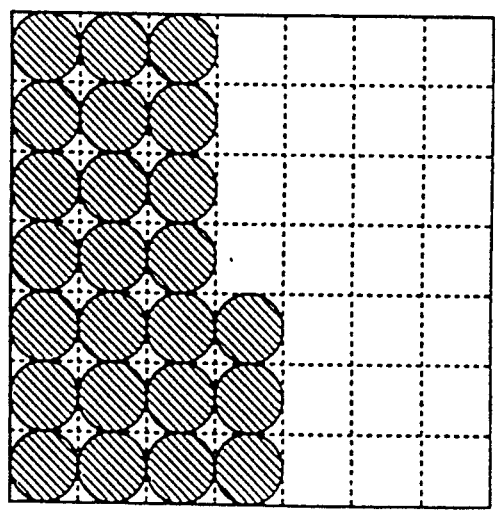
FIGS. 23(a) and 23(b) are diagrams for illustrating a binary data expansion processing to be performed by the image processing system embodying the present invention.

FIG. 23(a) illustrates image data obtained by the binary data expansion portion 24 by converting binary data into 8-bit 256-level data without an edge smoothing processing. Therefore, if the intensity level of a pixel, which is indicated by the binary data, is 0, the intensity level of the same pixel indicated by the image data obtained in the binary data expansion portion 24 remains 0. However, if the intensity level of a pixel, which is indicated by the binary data, is 1, the intensity level of the same pixel indicated by the image data obtained in the binary data expansion portion 24 becomes 255. FIG. 23(b) illustrates a dot-image obtained by printing the image data of FIG. 23(a). Practically, an edge smoothing processing is performed and as the result, images as illustrated in FIG. 24 are obtained.

Figures 24A, 24B:
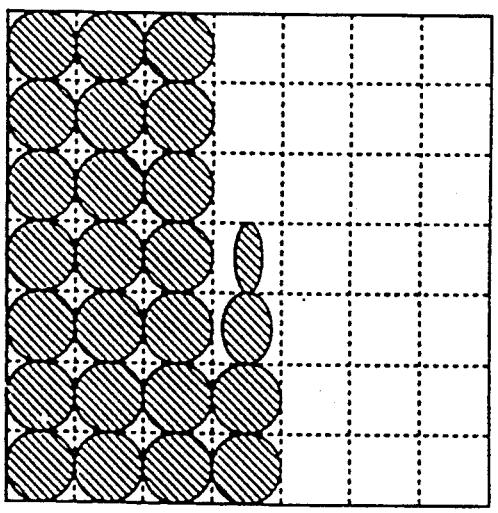
FIGS. 24(a) and 24(b) are diagrams for illustrating an edge smoothing processing to be performed in a binary data expansion portion of the image processing system embodying the present invention.

FIG. 24(a) shows image data obtained by the binary data expansion portion 24 by converting binary data into 8-bit 256-level data and performing an edge smoothing processing. As is seen from a comparison made between FIGS. 22(b) and 24(a), the binary level 0 of a pixel of an edge portion of FIG. 22(b) is changed into 85 in an image of FIG. 24(a). Further, the binary level 1 of another pixel of the edge portion of FIG. 22(b) is changed into 170 in the image of FIG. 24(a). Thus the edge portion is smoothed. FIG. 24(b) is a dot-image obtained by printing the image data of FIG. 24(a).

FIG. 25(a) illustrates the data stored in the image discrimination memory 14 in case where all of the image data of the pixels are halftone data. All of the data of FIG. 25(a) becomes 1 which indicates that the image data of each pixel is halftone data. FIG. 25(b) illustrates the contents of the image data memory 13 in case where image data of all pixels are halftone data. As shown in this figure, each block consists of 2×2 pixels. Further, 4 bits of 4-bit 26-level image data of each block are stored at addresses of 4 pixels of the block, respectively, in such a manner that the four bits of the image data of a block have a one-to-one relationship with the four pixels of the same block. Because all of the image data are halftone data, only data indicating 0 are sent to the binary data expansion portion 24. Thus the image data are processed only in the halftone data expansion portion 25.

FIG. 26(a) illustrates 4-bit 16-level image data obtained correspondingly to each block by converting the halftone data by the binary data expansion portion 24. Because all data to be converted are halftone data, the level indicated by the halftone data of each block is not changed at the time of effecting the conversion (namely, the expansion). FIG. 26(b) illustrates 256-level image data representing expanded intensity levels of pixels of each block and obtained by converting the 16-level image data, which represent the intensity level of each block, in the pixel-unit conversion portion 61.

FIG. 27(a) illustrates image discrimination data stored in the image discrimination memory 14 in case where binary image data and halftone image data coexist in input image data. As viewed in this figure, the image discrimination data of pixels of the left part of the input image are 1 (corresponding to a halftone pixel) and the image discrimination data of pixels of the right part of the input image are 1 (corresponding to a binary pixel). FIG. 27(b) illustrates corresponding image data stored in the image data memory 13. Namely, binary image data are obtained correspondingly to each pixel and stored at a location of the memory corresponding to each pixel. Further, halftone image data are obtained correspondingly to each block and stored as 4-but image data, each bit of which is stored at a corresponding one of four locations of the memory respectively corresponding to four pixels of each block. Further, halftone data of each halftone pixel of a block (hereunder sometimes referred to as a mixed block), in which both of binary and halftone pixels coexist, is stored in 4-bit image data as predetermined 1-bit thereof corresponding to the position of the halftone pixel in the block.

The binary image data and the halftone image data coexist in the image data. Thus the binary data are input through the demultiplexer 23 to the binary data expansion portion 24, whereupon the binary data are processed. On the other hand, the halftone data are input through the demultiplexer 23 to the halftone data expansion portion 25, whereupon the halftone data are processed.

FIG. 28(a) illustrates binary image data indicated by the binary data signal 41. FIG. 28(b) illustrates 8-bit 256-level image data obtained by the binary data expansion portion 24 by converting binary data in case where an edge smoothing processing is not effected. As is seen from this figure, if the intensity level of a pixel, which is indicated by the binary data, is 0, the intensity level of the same pixel indicated by the image data obtained in the binary data expansion portion 24 remains 0. In contrast, if the intensity level of a pixel, which is indicated by the binary data, is 1, the intensity level of the same pixel indicated by the image data obtained in the binary data expansion portion 24 becomes 255. FIG. 28(c)

illustrates 8-bit 256-level image data obtained by the binary data expansion portion 24 by converting binary data in case where an edge smoothing processing is performed. As is seen from a comparison made between FIGS. 28(a) and 28(c), the binary level 0 of pixels of edge portions of FIG. 28(a) is changed into 85. Further, the binary level 1 of other pixels of the edge portions of FIG. 28(a) is changed into 170. Thus the edges portions are smoothed. However, in practice, an edge smoothing processing is not performed on a boundary portion between binary and halftone portions. Therefore, the binary image data are converted (namely, expanded) as illustrated in FIG. 28(d).

FIG. 29(a) illustrates halftone image data indicated by the halftone data signal 51. FIG. 29(b) illustrates 4-bit 16-level image data obtained by the binary data expansion portion 24 by converting the halftone image data. Namely, the level indicated by 4-bit halftone data of halftone blocks are not changed but are employed in the image data obtained by the binary data expansion portion 24. In contrast, the levels indicated by the image data of binary and mixed blocks, which are obtained by the binary data expansion portion 24, remain 0. FIG. 29(c) illustrates how the levels of adjacent halftone blocks located in the left side of the mixed blocks are copied and employed as the halftone levels of the mixed blocks. FIG. 29(d) illustrates 256-level image data obtained correspondingly to each pixel by the pixel-unit conversion portion 61 by converting the 16-level image data obtained correspondingly to each block.

FIG. 30 illustrates image data represented by the image expansion signal 27, which is synthesized by the multiplexer 26 from binary expansion data of FIG. 28(d) and halftone expansion data of FIG. 29(d).

Thus, the image expansion signal of a color BK is obtained by repeatedly performing the above described image expansion processing by the image expansion portion 15. The image expansion signals of the other printing colors are similarly obtained.

The image expansion signal representing 8-bit data obtained by the image expansion portion 15 and the image discrimination signal representing 1-bit data are sent to the tone processing portion 16.

Hereinafter, another example of a special processing to be performed on a boundary portion between binary and halftone data will be described by referring to FIGS. 31 to 33.

Figure 31:
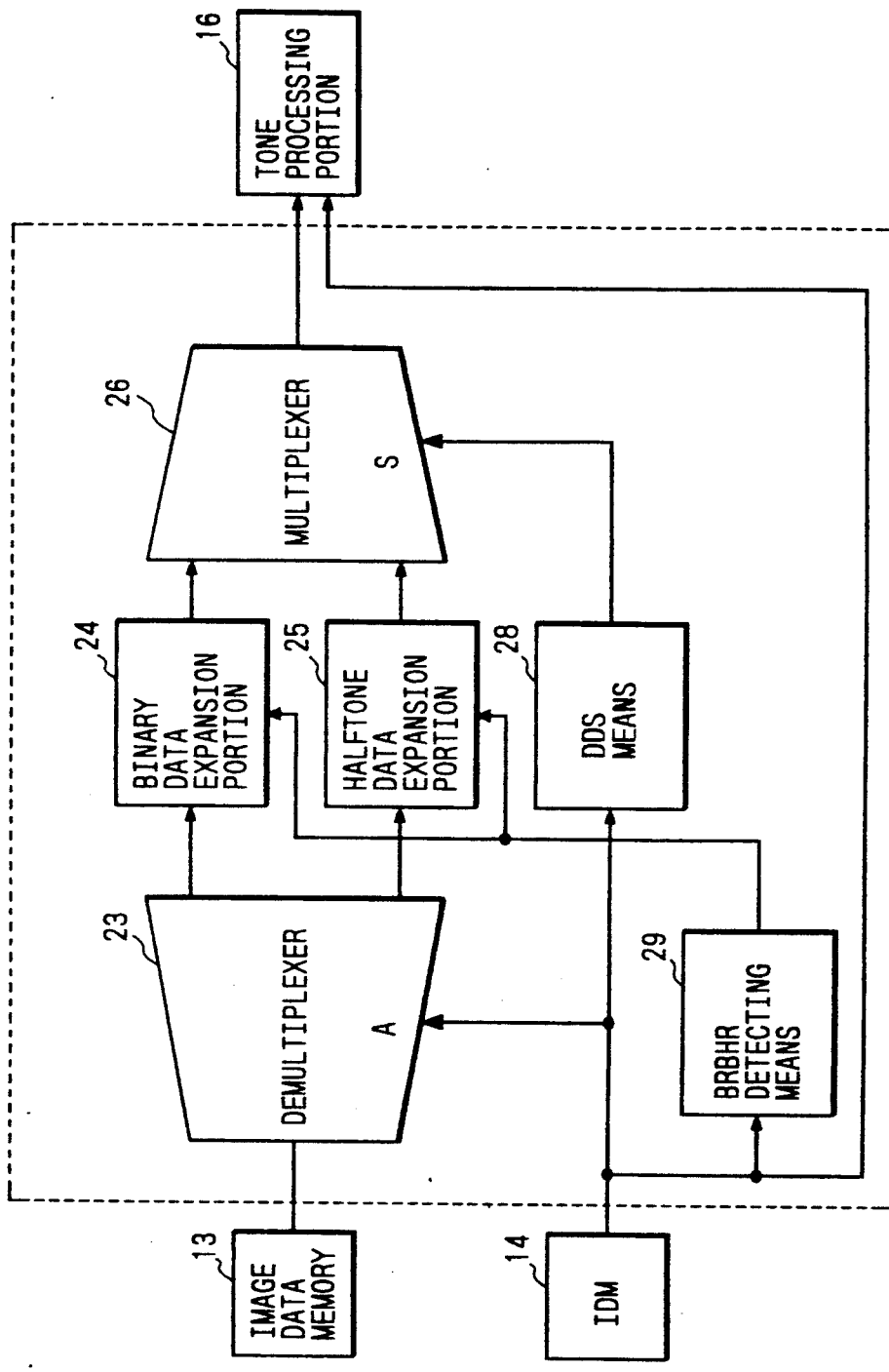
FIG. 31 is a schematic block diagram for illustrating the configuration of an image expansion portion, which is provided with border detection means, of the image processing system embodying the present invention.

FIG. 31 is a schematic block diagram for illustrating the configuration of another example of the image expansion portion 15. First, image data are read from the image data memory 13. Further, image discrimination data for discriminating characters from images are read from the image discrimination memory 14. These data are split into data to be processed by the binary data expansion portion 24 and data to be processed by the halftone data expansion portion 25. Here, a boundary-region-between-binary-and-halftone-regions detecting means 29 generates and sends a signal, which indicates whether or not current image data represent a boundary region between binary and halftone regions, to the binary data expansion portion 24 and the halftone data expansion portion 25. Thereby, an image processing of the boundary region can be changed. Next, a multiplexer 26, of which the selection terminal S receives an output of a discrimination data synchronization means 28 for synchronizing an inputting of the image discrimination data transmitted from the image discrimination memory 14 to the multiplexer 26 with an inputting of the outputs of the binary data expansion portion 24 and the halftone data expansion portion 25, selects one of the outputs of the binary data expansion portion 24 and the halftone data expansion portion 25 and synthesizes the image expansion signal from the selected data. Then, the multiplexer outputs the synthesized image expansion signal to the tone processing portion 16.

Figure 32:
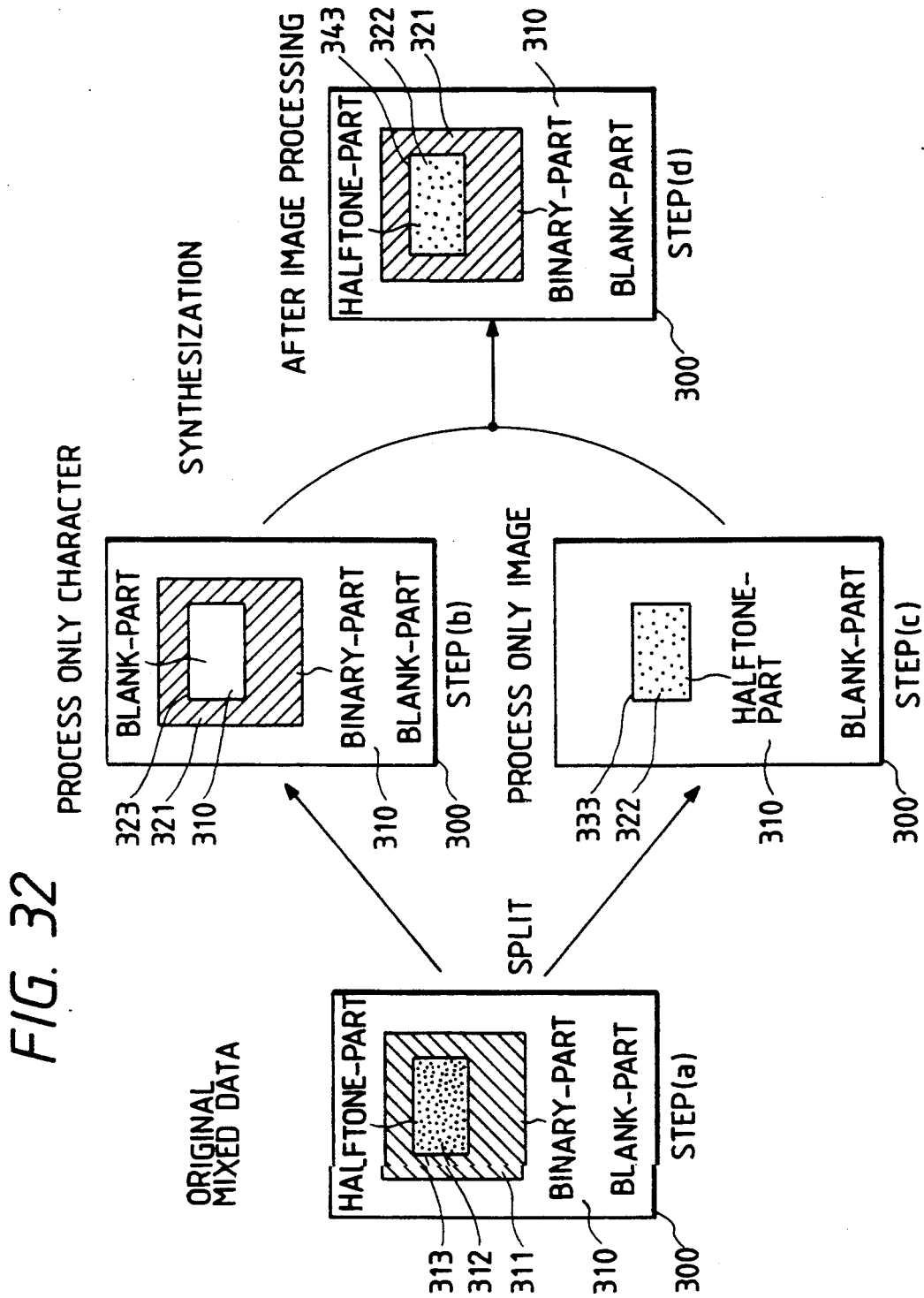
FIG. 32 is a diagram for illustrating a process of an image processing at the time of detecting a border by the image expansion portion of the image processing system embodying the present invention.

FIG. 32 illustrates a process of processing image data of one page in the embodiment of the present invention. In step (a), original image data to be processed later are received. The original image data 300 of one page consists received. The original image data 300 of one page consists of binary-part image data 311, halftone-part image data 312 and a blank-part image data 310. Next, in step (b), an image processing of only the binary-part image data 311 is performed by regarding the halftone-part image data 312 as a blank-part image data 310. As the result, processed binary-part image data 321 are obtained. Further, in step (c), an image processing of only the halftone-part image data 312 is performed by regarding the binary-part image data 311 as a blank-part image data 310. As the result, processed halftone-part image data 322 are obtained. In step (d), image data synthesized from the binary-part image data 321 obtained in step (b) and the halftone-part image data 322 obtained in step (c) are displayed. Namely, the image data 300 of one page consisting of the binary-part image data 321, the halftone-part image data 322 and the blank-part image data 310 are formed.

Incidentally, a boundary-region detection signal output from the boundary-region-between-binary-and-halftone-regions detecting means 29 is used to inhibit an edge smoothing processing of binary image data and a space filtering processing of halftone-part image data.

Figure 33:
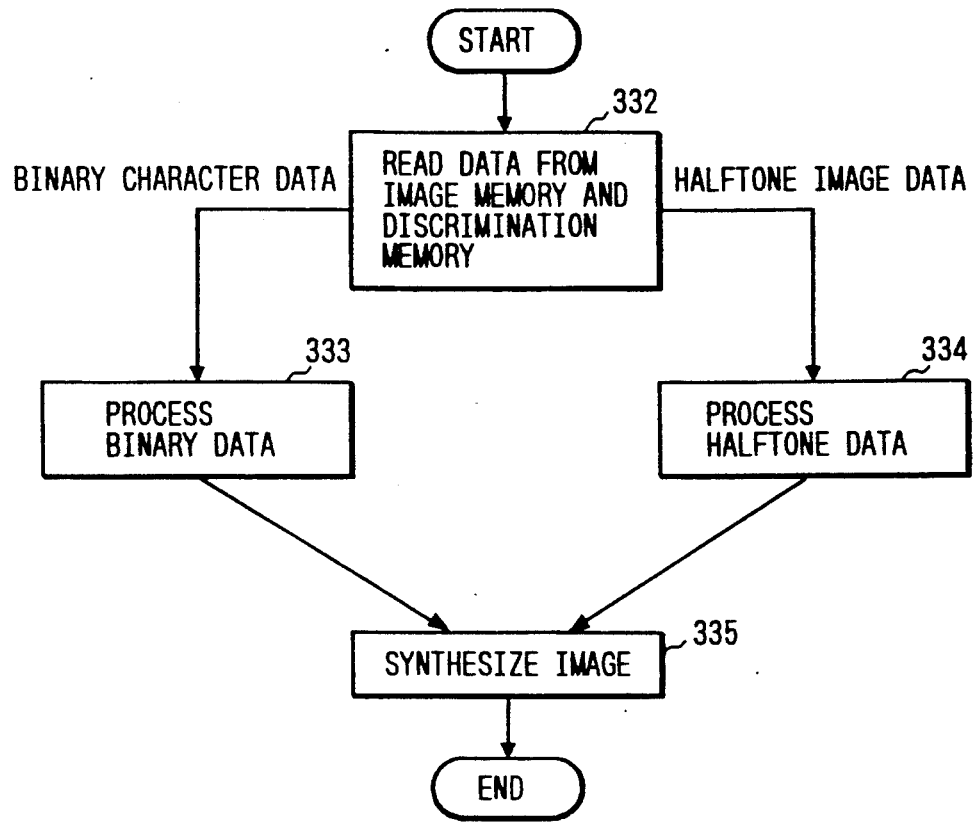
FIG. 33 is a flowchart of a program for performing the image processing at the time of detecting a border by the image expansion portion of the image processing system embodying the present invention.

FIG. 33 is a flowchart of a program for performing an image processing of image data in the embodiment of the First, in step 332, image data are read from the image data memory 13. Additionally, image discrimination data to be used for discriminating a binary image part from a halftone image part are read from the image discrimination memory 14. Then, the image data are split by the demultiplexer 23 into binary-part image data and halftone-part image data. Subsequently, in step 333, the binary-part image data are processed in the binary-data expansion portion 24. Simultaneously, in step 334, the halftone-part image data are processed in the halftone-data expansion portion 25. Thereafter, in step 335, one of the results of the processing performed in the portions 24 and 25 are selected according to the image discrimination data output from the image discrimination memory 14. Further, an image synthesizing processing is performed in the multiplexer 26.

As is apparent from the foregoing description, an image discrimination memory for storing character information and image information, as well as a boundary-region detecting means for detecting a boundary region between binary and halftone regions, is provided in the configuration of the embodiment. Thereby, even in case where character data and image data coexist in image data of the same page, the character data and the image data can simultaneously be processed.

In the tone processing portion 16 of FIG. 2, the image density regulation processing, the gamma correction processing and the screen-angle forming processing are performed as previously described. However, a processing to mainly be performed in the portion 16 is a tone modulation processing, namely, a stabilizing of a tone to be reproduced by the printer engine 3 by regulating the growth of dots according to the positions of pixels corresponding to the dots.

Figure 34A:
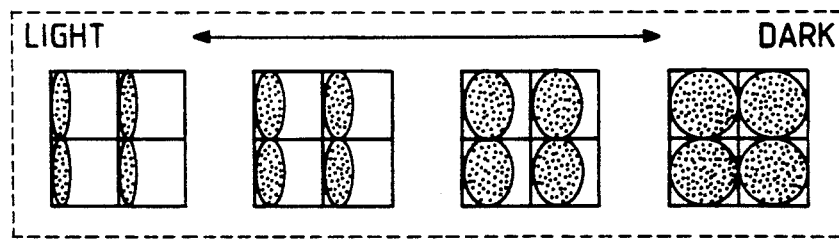
FIGS. 34(a) and 34(b) are diagrams for illustrating a tone modulation to be performed by a tone processing portion of the image expansion portion of the image processing system embodying the present invention.
Figure 34B:
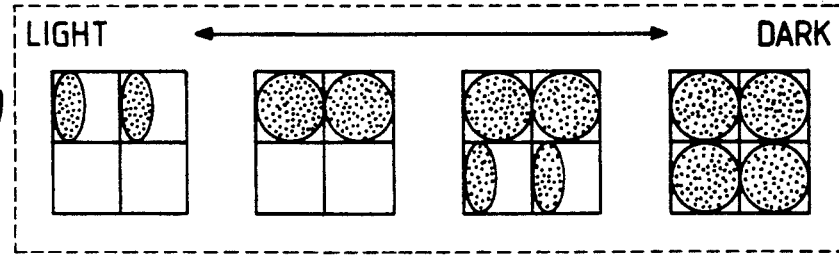

First, the principle of the tone modulation processing will be described by referring to FIG. 34. FIG. 34(a) illustrates a conventional one-pixel tone modulation processing. As is seen from this figure, in case of the conventional one-pixel tone modulation processing, dots respectively corresponding to pixels are made to uniformly grow. In contrast, as shown in FIG. 34(b), in case of the tone modulation processing performed in the embodiment of the present invention, pixels are first partitioned into blocks, each of which has two groups of pixels. Further, dots corresponding to one of the groups of pixels of each block is made to grow earlier than dots corresponding to the other group of pixels of each group. Namely, there are two kinds of growth patterns (or speeds) of dots. In other words, there is established a difference in speed of growth between dots respectively corresponding to two groups of pixels of each group. Thus the tone reproduced by the printer engine 3 is stabilized.

Figure 35:
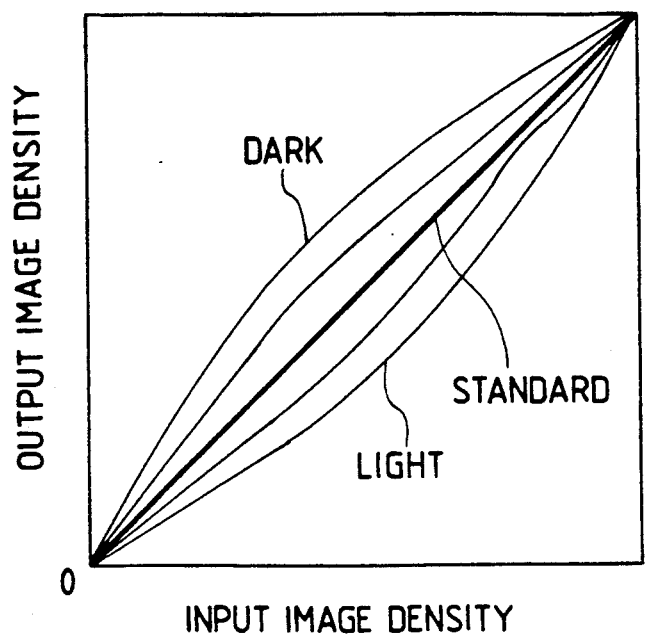
FIG. 35 is a graph for showing density regulating characteristics of the tone processing portion of the image processing system embodying the present invention.

The image density regulation processing, which is a kind of regulation processing of picture quality, of a halftone image portion is performed according to an image density regulation signal output from the operating portion 8 of the printer. A characteristic curve representing density regulation characteristics is set as illustrated in FIG. 35. Incidentally, the image density regulation processing of a binary image portion is controlled by using only the maximum density.

Regarding the gamma correction, to perform the gamma correction automatically, a predetermined image density pattern is formed in the printer engine 3 before image data are actually printed by the printer. Further, the density levels of pixels of an image to be printed are measured therein. Then, gamma correction characteristic information is obtained from data representing the measured density levels. Thus the gamma correction is performed according to the gamma correction characteristic information.

Among these processings, the above described tone modulation processing is performed by establishing a difference in speed of growth between of dots respectively corresponding to two groups of pixels of each block. Thus the tone modulation processing has a drawback in that when the same tone modulation pattern is used for printing image data corresponding to each color, interference fringes called Moire fringes are caused between portions respectively having printing colors and thus picture quality is considerably deteriorated if the registration of the patterns respectively having different colors is not perfect.

In case of printing a color printing image, the screen-angle technique is employed for preventing the occurrence of Moire fringes between portions having printing colors. The screen-angle processing is performed as follows. First, pixels of an image to be printed are partitioned into, for instance, 4×4 blocks. At that time, pixels of each block are partitioned into two groups in such a manner that dots respectively corresponding to one of the groups of pixels are made to grow earlier than dots corresponding to pixels of the other group.

Figure 36:
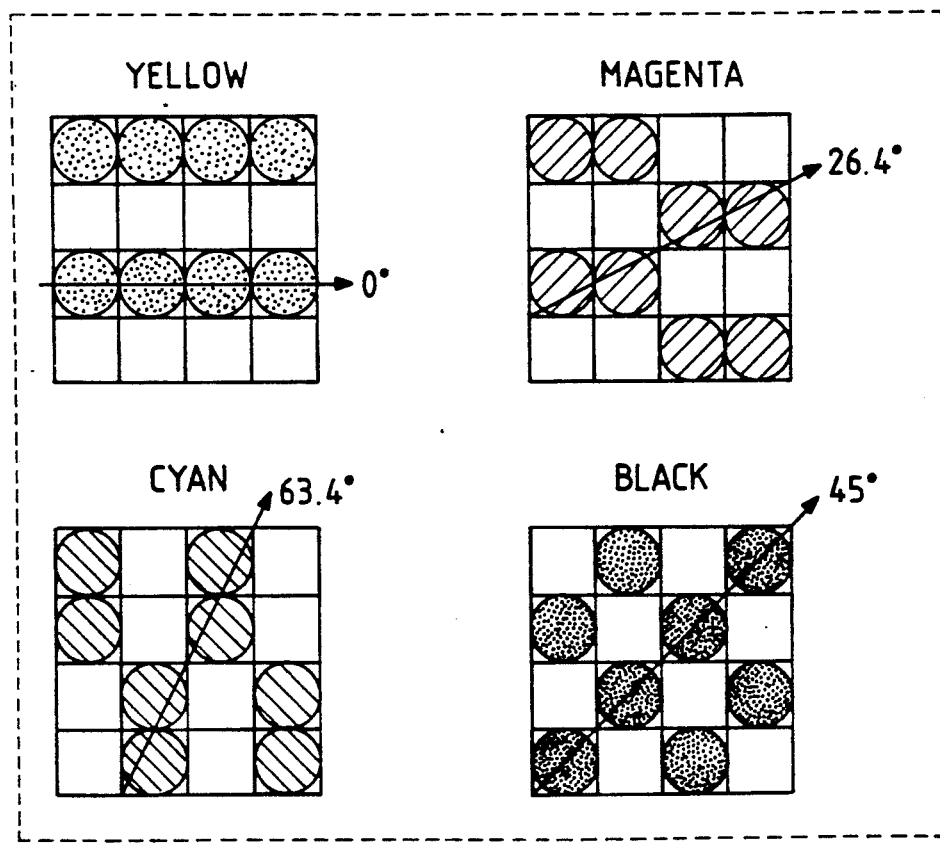
FIG. 36 is a diagram for illustrating screen angles used in the tone processing portion of the image processing system embodying the present invention.

For example, pixels of each block are partitioned into the two groups as illustrated in FIG. 36 by establishing screen angles respectively corresponding to the printing colors BK, C, M and Y in such a fashion to be different from one another. Namely, the screen angles corresponding to the printing colors BK, C, M and Y are set as 45°, 63.6°, 26.4° and 0, respectively. Thus the as 45°, 63.6°, 26.4° and 0, respectively. Thus the occurrence of Moire fringes between portions having printing colors is prevented.

Figure 37:
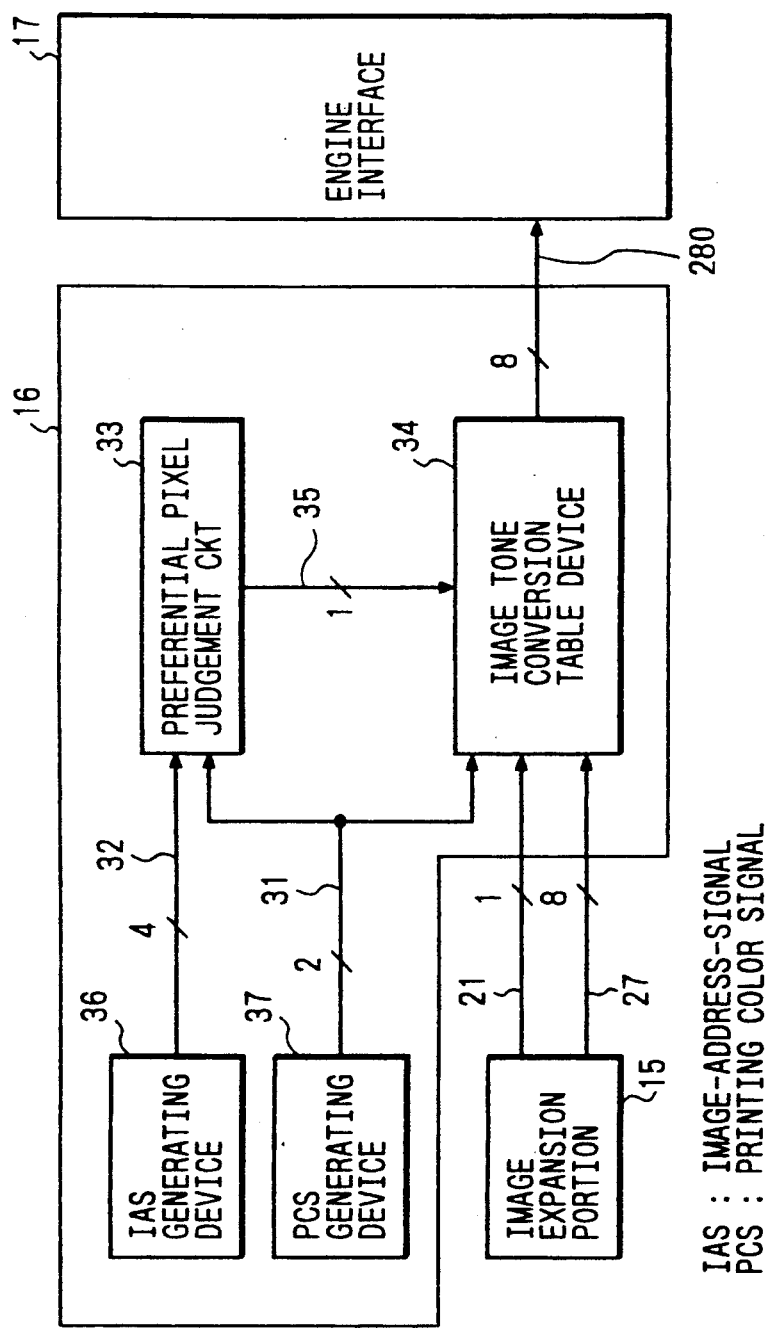
FIG. 37 is a schematic block diagram for illustrating the configuration of the tone processing portion of the image processing system embodying the present invention.

The above described processings (i.e., the tone modulation processing, the density regulation processing, the gamma correction and the screen-angle forming processing) are performed in the tone processing portion 16 by using a table. FIG. 37 is a schematic block diagram for illustrating the configuration of the tone processing portion 16. As shown in FIG. 37, the image expansion signal 27 output from the image expansion portion 15 is input to the image tone conversion table device 34 which converts the signal 27 into the image recording signal 280. Further, it is necessary to change tone (reproduction) characteristics by replacing the table used in the image tone conversion table device 34 with another table according to the printing colors.

Namely, the tone characteristics are changed as follows. First, information on the position of a pixel, the image data of which are currently processed, in 4×4 blocks is obtained by a preferential pixel judgement circuit 33 from an image address signal 32 representing 4-bit data, which is output from an image-address-signal generating device 36. Further, the circuit 32 receives information on the printing color currently used, which is represented by a printing color signal 31 output from a printing color signal generating device 37, and determines from the received information whether or not the pixel corresponding to the currently processed image data is a preferential pixel. Then, the circuit 33 outputs a preferential pixel judgement signal 35 to the image tone conversion table device 34. Subsequently, the image tone conversion table device 34 selects one of tables according to the image discrimination signal 21, the printing color signal 31 and the preferential pixel judgement signal 35 and converts the image expansion signal 27 into the image recording signal 280 by referring to the selected table.

The image recording signal 280 is converted into a level signal (e.g., a signal representing pulse width data) to be used for actually driving a laser. Further, the following three tables are preliminarily provided in the image tone conversion table device 34 correspondingly to each printing color. One is a table for binary image data (corresponding a image discrimination signal indicating 0), which is also used to process middle levels generated in an edge smoothing of binary data representing characters and line drawings. Further, one of the other tables is a table for halftone image data (corresponding a image discrimination signal indicating 1), which is also used for the group of pixels, the corresponding dots of which should is a table for halftone image data (corresponding a image discrimination signal indicating 1), which is also used for the group of pixels, the corresponding dots of which should the group of pixels, the corresponding dots of which should be made to grow later.

As above described, in case of this embodiment of the present invention, pixels corresponding to spatial positions of an image to be printed are split in the halftone data processing by the tone processing portion 16 into two groups, namely, a group of pixels, the corresponding dots of which are made to grow earlier, and the other group of pixels, the corresponding dots of which are made to grow later. Further, data are forcibly concentrated to the group of pixels, the corresponding dots of which are made to grow earlier. Thus the embodiment of the present invention has substantial effects in that there is caused a strong electric field in a microregion of an electrostatic latent image on a photoreceptor. This contributes to improvement of tone reproduction very much.

Next, the printer engine 3 will be described hereinafter by referring to FIG. 38.

Figure 38:
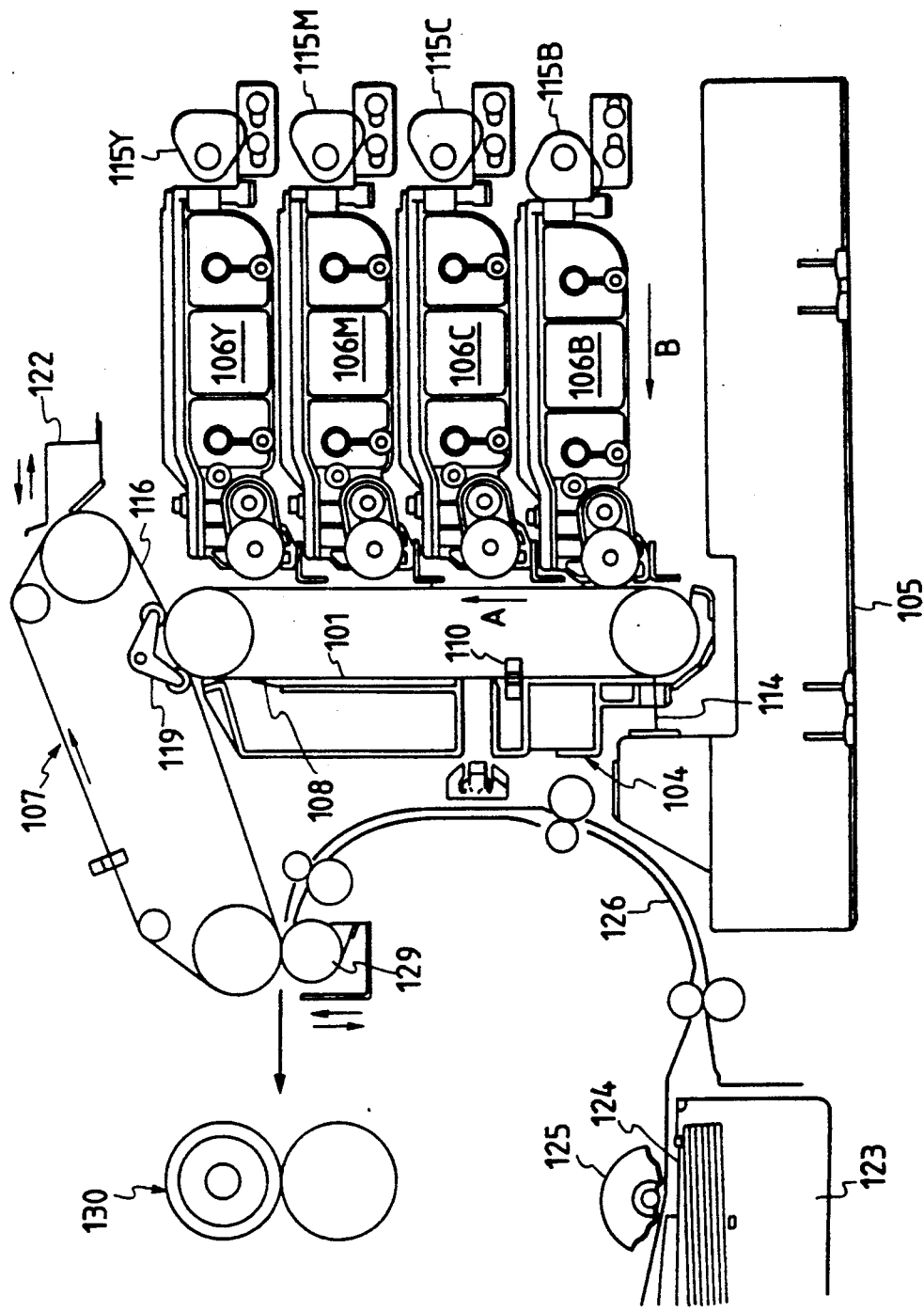
FIG. 38 is a side view of an image forming device employing the image processing system embodying the present invention.
Figure 39:
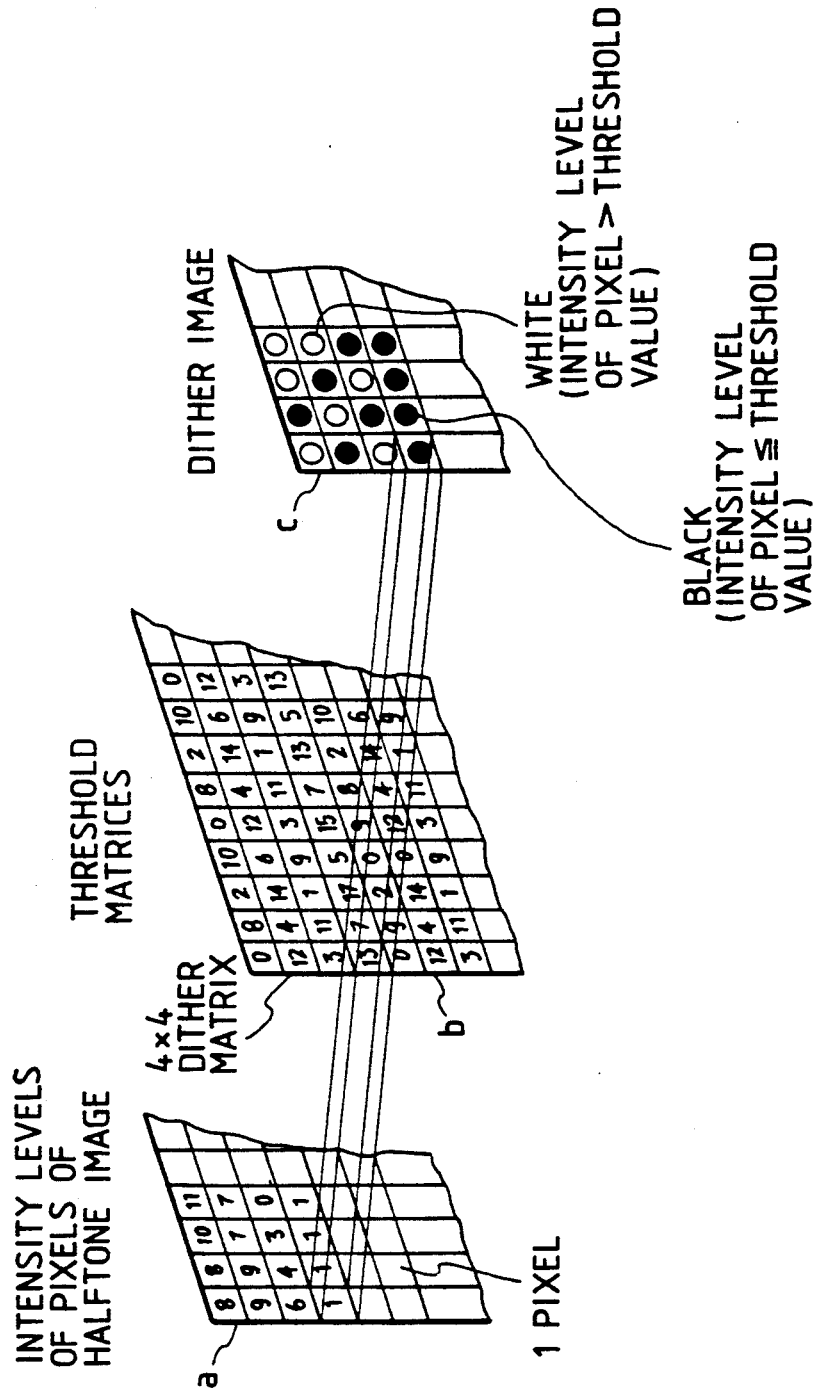
FIG. 39 is a diagram for illustrating a conventional binary dither method.

FIG. 38 is a diagram depicting a side view of the printer engine 3 employed in a LBP. In FIG. 38, reference numeral 101 designates a photoreceptor on an outer surface of which a photosensitive layer made of organic photoconductive (OPC) material or the like is coated like a thin-film. This photoreceptor 101 is fed to the direction indicated by an arrow A and rotates around the rollers turned by a drive motor (not shown). On an outer surface of the belt-like photoreceptor 101, a charging device 104, an optical system 105 for exposure, developing devices 106B, 106C, 106M and 106Y respectively corresponding to the printing colors, namely, black (Bk), cyan (C), magenta (M) and yellow (Y), an intermediate toner transfer unit 107 and a photoreceptor cleaning device 108 are provided in this order in the direction of rotation of the photoreceptor as indicated by the arrow A. The charging device 104 charges the photoreceptor 101 uniformly by utilizing a corona discharge. Reference numeral 114 designates a ray of light emitted from the optical system 105 for exposure of image data. In this LBP, the ray 114 is obtained by applying to a semiconductor laser (not shown) an image signal obtained as the result of light-intensity modulation and pulse-width modulation performed by a laser drive circuit (not shown) on an output signal of the image processing unit 2. Further, the ray 114 forms a plurality of electrostatic latent images respectively corresponding to specific ones of the predetermined color components on the photoreceptor 101. Each of the developing devices 106B, 106C, 106M and 106Y contains toner corresponding to a corresponding kind of the printing colors. The selection of the printing color is performed by selecting one of the developing devices (e.g., the device 106B) and making the selected developing device touch the photoreceptor 101. The developing devices (e.g., 106C, 106M and 106Y in this case) other than the selected one are separated from the photoreceptor 101. Further, the selection of the developing device is effected by making cams 115B, 115C, 115M and 115Y, each of which corresponds to a corresponding one kind of the printing colors and is rotatably supported at both ends thereof by axes of the body of the LBP, rotate in response to a color selecting signal. The intermediate toner transfer unit 107 has a closed-loop belt-like seam-less intermediate toner transfer device 116 made of conductive resin or the like. Reference numeral 122 represents an intermediate-toner-transfer-device cleaning device for clearing away residual toner on the intermediate toner transfer device 116. The device 122 is separated away from the device 116 when a synthetic image is being formed on the device 116. In contrast, the device 122 is in contact with the device 116 only when cleaning the residual toner. Reference numeral 123 indicates a paper feeding cassette for accommodating sheets of printing paper 124. Each sheet of the printing paper is fed from the cassette 123 by a crescent-shaped paper feeding roller 125 to a paper conveying path 126. Reference numeral 129 indicates a toner transfer roller for transfer the synthetic image formed on the intermediate toner transfer device 116 to the toner transfer material 124. The toner transfer roller 129 comes in contact with the intermediate toner transfer device 116 and rotates around an axis of rotation thereof only when transferring the synthetic image formed on the intermediate toner transfer device 116 to the toner transfer material 124. A fixation device 130 forms a color image by fixing the transferred synthetic image on the toner transfer material 124 by heat and pressure.

Hereinafter, an operation of the thus constructed electrophotographic device will be described.

The photoreceptor 101 and the intermediate toner transfer device 116 are driven by the corresponding driving force sources (not shown), respectively, and are controlled to rotate at the same constant rate. Under this condition, high voltage is first applied to the charging device 104 connected to a high-voltage source so as to cause a corona discharge therein. Thus the surface of the photoreceptor 101 is uniformly charged in such a manner that the electric potential on the surface of the photoreceptor 101 is of from $-700$ volts (V) to $-800$ V or so. Next, the photoreceptor 101 is made to rotate to the direction indicated by the arrow A. Further, the ray or laser beam 114 corresponding to a predetermined one (e.g., black (B) component) of the color components is irradiated on the uniformly charged surface of the photoreceptor 101. This results in that electric charges on the irradiated portion of the surface of the photoreceptor 101 are eliminated and an electrostatic latent image is formed thereon. On the other hand, the developing device 106B containing black toner for developing the latent image is pressed to the direction indicated by an arrow B by rotating the cam 115B in accordance with a color selecting signal so as to come in contact with the photoreceptor 101. The toner adheres to a portion, on which the latent image is formed, of the surface of the photoreceptor 101 so as to form a toner image thereon. Thus the development is finished. Upon completion of the development, the developing device 106B is separated from the photoreceptor 101 by rotating the cam 115B around the axis of rotation thereof by 180 degrees. The toner image formed on the photoreceptor 101 by the developing device 106B is transferred onto the intermediate toner transfer device 116 by applying high voltage to the roller 119 arranged in such a way to touch the photoreceptor 101 correspondingly to each color. Then, the residual toner on the surface of the photoreceptor 101 is cleared away therefrom by the photoreceptor cleaning device 108.

Next, if cyan (C) is selected, the cam 115C is rotated this time and thus the developing device 106C is pressed against the photoreceptor 101 in such a manner to come in contact therewith. Thus the development using cyan (C) is started. In case of employing the four kinds of colors, the foregoing development process is repeated four times. Consequently, the toner images of the colors B, C, M and Y formed on the intermediate toner transfer device 116 are overlapped with one another to form a synthetic image. The thus formed synthetic image is collectively transferred by pressure to the printing paper 124 fed along the paper conveying path 126 from the paper feeding cassette 123 by making the roller 129 touch the device 116 and applying high voltage to the roller 129. Subsequently, the printing paper, namely, the toner transfer material 124, onto which the toner image is transferred, is fed to the fixation device 130 whereupon the toner image is fixed by heat and pressure. Finally, a resultant color image is outputted therefrom. Thereafter, the residual toner on the intermediate toner transfer device 116 is cleared away therefrom by the cleaning device 122.

By performing the above described operation, a printing of an image on a sheet of the printing paper is completed. Thus a color printed image, the density of which is regulated in a predetermined manner, is obtained.

Incidentally, the printer engine 3 is not limited to the LBP of the electrophotographic type of this embodiment employing laser beams and may be a thermal transfer printer, an ink jet printer or other kinds of printers of the electrophotographic type (namely, printers of the light emitting diode (LED) type and of the liquid crystal shutter type).

Further, this embodiment employs a system in which a color image is overlapped on the intermediate toner transfer device. Instead, this embodiment may employ a system in which a color image is overlapped on the photoreceptor or the toner transfer paper.

As is apparent from the foregoing description, in case of the image processing system of the present invention, the memory capacity of the image memory can be small. Further, in accordance with the present invention, there is provided an image forming apparatus which can obtain a printed image of high-picture-quality.

While a preferred embodiment of the present invention has been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. An image processing system comprising:
   reception means for receiving image information;
   output means for outputting image information at high resolution in case where the received image information is of a two-density-level type, for outputting image information at resolution lower than the high resolution in case where the received image information is of a type other than a two-density-level type and for outputting discrimination information indicating whether or not the image information to be output is of a two-density-level type; and
   processing means for performing a first image processing of the image information indicated by the discrimination information sent from the output means as of a two-density-level type, for performing a second image processing of the image information indicated by the discrimination information sent from the output means as of a type other than a two-density-level type, and for outputting a signal representing a result of each of the first and second image processings,
   wherein the processing means performs an operation of changing the resolution corresponding to the image information of a two-density-level image type as equal to that corresponding to the image information of a type other than a two-density-level image type.

2. An image processing system comprising:
   reception means for receiving image information;
   output means for outputting image information at high resolution in case where the received image information is of a two-density-level type, for outputting image information at resolution lower than the high resolution in case where the received image information is of a type other than a two-density-level type and for outputting discrimination information indicating whether or not the image information to be output is of a two-density-level type; and
   processing means for performing a first image processing of the image information indicated by the discrimination information sent from the output means as of a two-density-level type, for performing a second image processing of the image information indicated by the discrimination information sent from the output means as of a type other than a two-density-level type, and for outputting a signal representing a result of each of the first and second image processings,
   wherein the processing means performs an operation of changing the resolution corresponding to the image information of a type other than a two-density-level type as equal to that corresponding to the image information of a two-density-type.

3. An image processing system comprising:
   reception means for receiving image information;
   output means for outputting image information at high resolution in case where the received image information is of a two-density-level type, for outputting image information at resolution lower than the high resolution in case where the received image information is of a type other than a two-density-level type and for outputting discrimination information indicating whether or not the image information to be output is of a two-density-level type;
   processing means for performing a first image processing of the image information indicated by the discrimination information, which is sent from the output means, as of a two-density-level type, for performing a second image processing of the image information indicated by the discrimination information, which is sent from the output means, as of a type other than a two-density-level type, and for outputting a signal representing a result of each of the first and second image processings; and
   boundary processing means for performing a predetermined boundary processing on image information representing a boundary portion between a portion represented by the image information of a two-density-level type and another portion represented by the image information of a type other than a two-density-level type and for outputting a signal representing a result of the predetermined boundary processing.

4. The image processing system according to claim 3, wherein if image information of a pixel, which does not meet a predetermined processing condition for performing the first or second image processing, is included in the image information of a two-density-level type and the image information of a type other than a two-density-level type, which are sent from the output means, the boundary processing means performs the boundary processing of the image information of the pixel by using image information of another neighbouring pixel, which is of the same type.

5. The image processing system according to claim 3, wherein the image information of a two-density-level type received by the reception means represents a character.

6. An image processing system comprising:
reception means for receiving image information;
first storage means for storing image information at high resolution in case where the received image information is of a two-density-level type, and for storing image information at resolution lower than the high resolution in case where the received image information is of a type other than a two-density-level type;
second storage means for storing discrimination information indicating whether or not the image information stored in the first storage means is of a two-density-level type; and
output means for reading the image information from the first storage means and the discrimination information from the second storage means, for outputting the read image information by changing the resolution corresponding to the image information of a two-density-level image type as equal to that corresponding to the image information of a type other than a two-density-level image type and for outputting the read discrimination information.

7. An image processing system comprising:
reception means for receiving image information;
first storage means for storing image information at high resolution in case where the received image information is of a two-density-level type, and for storing image information at resolution lower than the high resolution in case where the received image information is of a type other than a two-density-level type;
second storage means for storing discrimination information indicating whether or not the image information stored in the first storage means is of a two-density-level type; and
output means for reading the image information from the first storage means and the discrimination information from the second storage means, for outputting the read image information by changing the resolution corresponding to the image information of a type other than a two-density-level type as equal to that corresponding to the image information of a two-density-level type and for outputting the read discrimination information.

8. An image processing system comprising:
reception means for receiving image information;
first storage means for storing image information at high resolution in case where the received image information is of a two-density-level type, and for storing image information at resolution lower than the high resolution in case where the received image information is of a type other than a two-density-level type;
second storage means for storing discrimination information indicating whether or not the image information stored in the first storage means is of a two-density-level type;
output means for reading the image information from the first storage means and the discrimination information from the second storage means and for outputting the read image information and the read discrimination information;
processing means for performing a first image processing of the image information indicated by the discrimination information, which is sent from the output means, as of a two-density-level type, for performing a second image processing of the image information indicated by the discrimination information, which is sent from the output means, as of a type other than a two-density-level type, and for outputting a signal representing a result of each of the first and second image processings; and
boundary processing means for performing a predetermined boundary processing on image information representing a boundary portion between a portion represented by the image information of a two-density-level type and another portion represented by the image information of a type other than a two-density-level type and for outputting a signal representing a result of the predetermined boundary processing.

9. The image processing system according to claim 8, wherein if image information of a pixel, which does not meet a predetermined processing condition for performing the first or second image processing, is included in the image information of a two-density-level type and the image information of a type other than a two-density-level type, which are sent from the output means, the boundary processing means performs the boundary processing of the image information of the pixel by using image information of another neighboring pixel, which is of the same type.

* * * * *